(12) United States Patent
Kobayashi et al.

(10) Patent No.: US 6,946,108 B2
(45) Date of Patent: Sep. 20, 2005

(54) FLUE GAS DESULFURIZATION APPARATUS AND FLUE GAS DESULFURIZATION SYSTEM, AND METHOD FOR OPERATING FLUE GAS DESULFURIZATION APPARATUS

(75) Inventors: Norihisa Kobayashi, Minato-ku (JP);
Akinori Yasutake, Nagasaki (JP);
Takashi Kurisaki, Nagasaki (JP);
Kiyoshi Tatsuhara, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/469,054

(22) PCT Filed: Oct. 16, 2002

(86) PCT No.: PCT/JP02/10739

§ 371 (c)(1),
(2), (4) Date: Aug. 26, 2003

(87) PCT Pub. No.: WO03/033117

PCT Pub. Date: Apr. 24, 2003

(65) Prior Publication Data

US 2004/0096390 A1 May 20, 2004

(30) Foreign Application Priority Data

| Oct. 17, 2001 | (JP) | 2001-318813 |
| Oct. 29, 2001 | (JP) | 2001-330280 |
| Nov. 15, 2001 | (JP) | 2001-349809 |
| Nov. 15, 2001 | (JP) | 2001-349810 |
| Dec. 3, 2001 | (JP) | 2001-368194 |

(51) Int. Cl.[7] .............. B01D 53/50; B01D 53/86; B01J 21/18; C01B 17/78; C01F 11/46
(52) U.S. Cl. .............. 423/244.03; 423/244.01; 423/244.09; 423/522; 423/555
(58) Field of Search .......... 423/244.01, 244.03, 423/244.09, 522, 529, 554, 555; 422/168–172, 177, 180

(56) References Cited

U.S. PATENT DOCUMENTS

| 3,836,630 | A | * | 9/1974 | Noguchi et al. | 423/243.03 |
| 4,101,635 | A | * | 7/1978 | Nambu et al. | 423/244.1 |
| 6,086,842 | A | * | 7/2000 | Kim et al. | 423/511 |
| 6,096,279 | A | * | 8/2000 | Iwashita et al. | 423/242.1 |
| 6,106,791 | A | * | 8/2000 | Mochida et al. | 423/239.1 |
| 6,616,905 | B1 | * | 9/2003 | Kawamura et al. | 423/244.01 |

FOREIGN PATENT DOCUMENTS

| JP | 11-347349 | 12/1999 |
| JP | 11-347350 | 12/1999 |

(Continued)

OTHER PUBLICATIONS

Raw Machine Translation of JP 11–347349 (corresponding to original document cited on enclosed PTO–1449).*

(Continued)

Primary Examiner—Stanley S. Silverman
Assistant Examiner—Ardith E. Hertzog
(74) Attorney, Agent, or Firm—Wenderoth, Lind & Ponack, L.L.P.

(57) ABSTRACT

A flue gas desulfurization apparatus includes at least one activated carbon fiber board 20 provided in a catalyst unit 6, the board being formed by alternatingly juxtaposing one or more plate-like activated carbon fiber sheets and one or more corrugated activated carbon fiber sheets so as to provide vertically extending conduits, wherein water for producing sulfuric acid is supplied, through a capillary phenomenon, to the activated carbon fiber board 20 provided in the catalyst unit 6. The flue gas desulfurization apparatus attains removal of sulfur oxides ($SO_x$) by adding a minimum required amount of water to the activated carbon fiber board 20 so as to attain uniform water distribution and can reduce the amount of water required for removing sulfur oxides ($SO_x$).

4 Claims, 31 Drawing Sheets

FOREIGN PATENT DOCUMENTS

| | | |
|---|---|---|
| JP | 11-347351 | 12/1999 |
| JP | 11-347354 | 12/1999 |
| JP | 11-347362 | 12/1999 |
| JP | 11-347363 | 12/1999 |
| JP | 2000-24461 | 1/2000 |
| JP | 2000-93742 | 4/2000 |

OTHER PUBLICATIONS

Raw Machine Translation of JP 11–347350 (corresponding to original document cited on enclosed PTO–1449).*

Human–Assisted (Thomas Derwent) Machine Translation of JP 11–347351 (corresponding to original document cited on enclosed PTO–1449).*

Human–Assisted (Thomas Derwent) Machine Translation of JP 11–347354 (corresponding to original document cited on enclosed PTO–1449).*

Human–Assisted (Thomson Derwent) Machine Translation of JP 2000–93742 (corresponding to original document cited on enclosed PTO–1449).*

Full English Translation of JP 11–347349, original document published Dec. 21, 1999.*

Full English Translation of JP 11–347350, original document published Dec. 21, 1999.*

Full English Translation of JP 11–347351, original document published Dec. 21, 1999.*

Full English Translation of JP 11–347354, original document published Dec. 21, 1999.*

Full English Translation of JP 2000–093742, original document published Apr. 4, 2000.*

* cited by examiner

F I G. 6 (A)
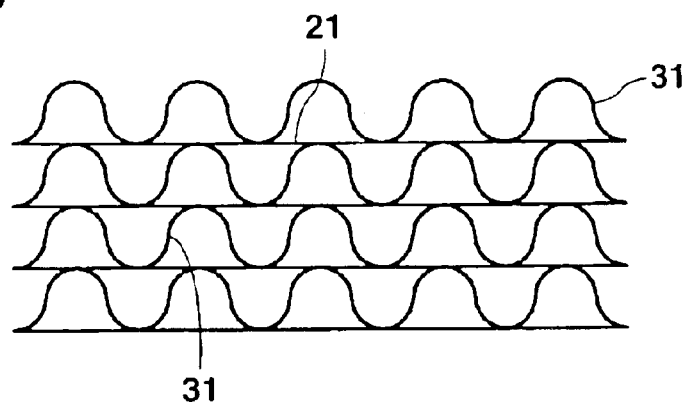
F I G. 6 (B)
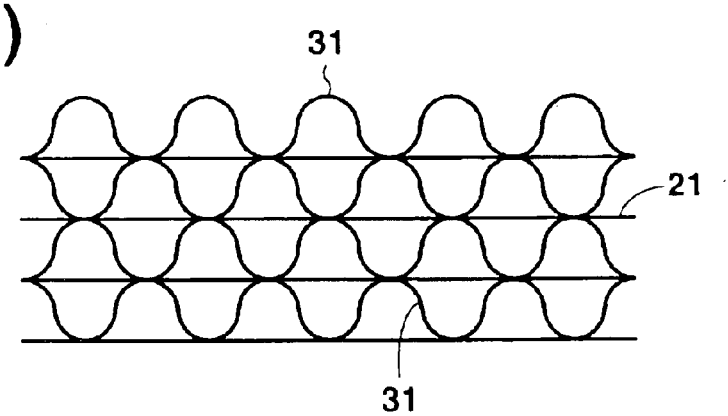
F I G. 6 (C)
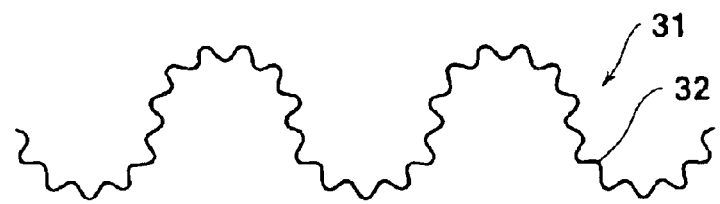

F I G. 15
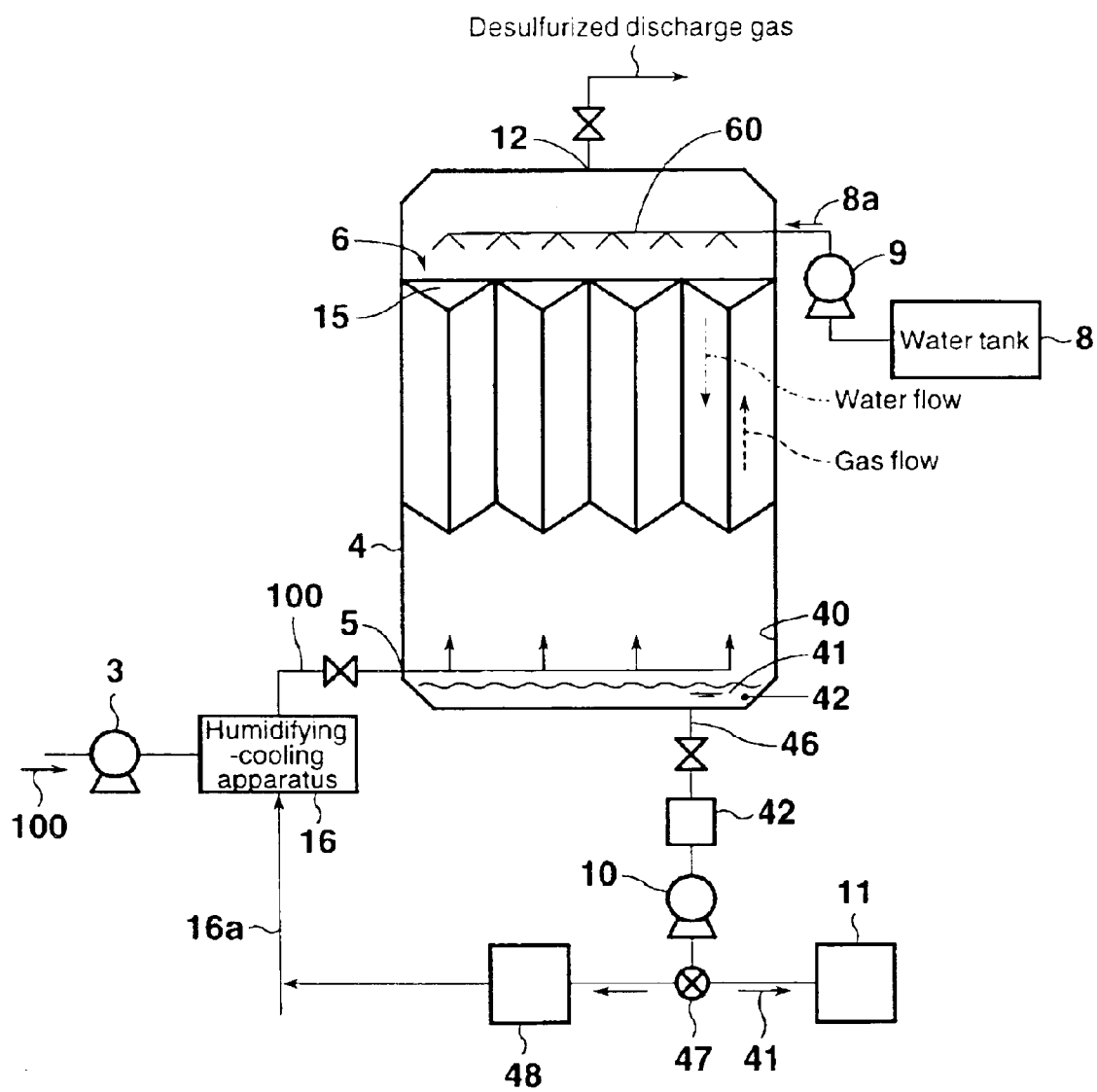

F I G. 28
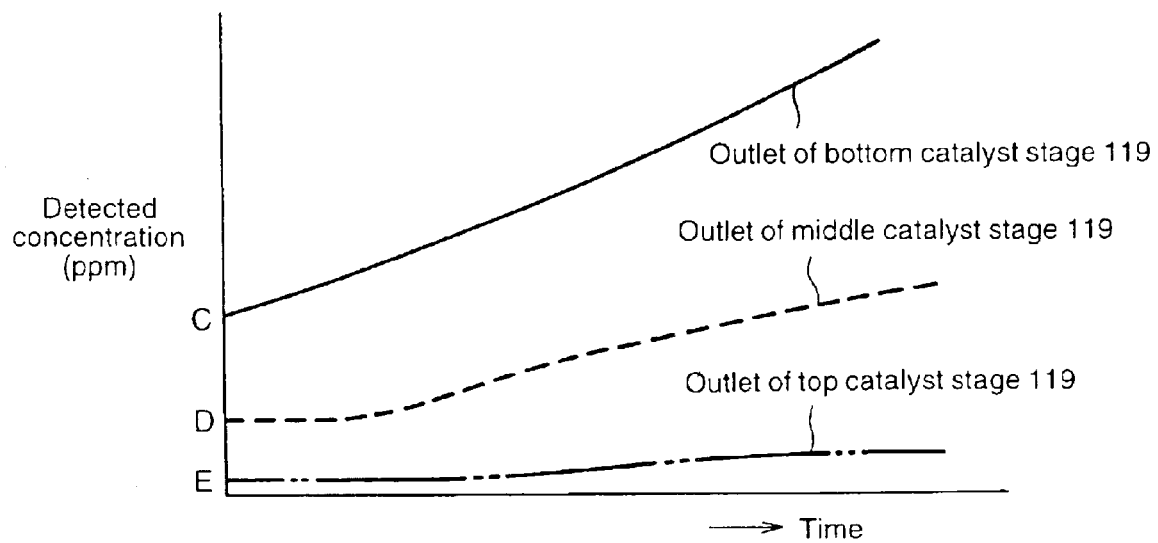

FLUE GAS DESULFURIZATION APPARATUS AND FLUE GAS DESULFURIZATION SYSTEM, AND METHOD FOR OPERATING FLUE GAS DESULFURIZATION APPARATUS

TECHNICAL FIELD

The present invention relates to a flue gas desulfurization apparatus and system for removing sulfur oxides ($SO_x$) contained in a discharge gas generated by a boiler, a gas turbine, an engine, an incinerator, or a similar facility combusting a fuel such as coal or heavy oil; and to a method for operating the flue gas desulfurization apparatus.

The present invention also relates to a desulfurization method for removing sulfur oxides ($SO_x$) contained in a discharge gas.

BACKGROUND ART

Sulfur oxides ($SO_x$) such as sulfur dioxide are contained in discharge gases generated by thermal power stations, plants such as chemical-production plants, metal-processing plants, sintering plants, and paper-making plants, and gas turbines, engines, incinerators, and similar facilities provided with a boiler employing a fuel such as coal or heavy oil. Thus, a flue gas desulfurization apparatus is employed in order to remove $SO_x$ contained in discharge gases. The flue gas desulfurization apparatus removes $SO_x$ contained in a discharge gas, by causing $SO_x$ to be adsorbed by a porous carbon material such as activated carbon fiber, oxidizing a sulfur component by oxygen contained in the discharge gas in the presence of the porous carbon material serving as a catalyst, and absorbing the oxidation product in water, to thereby form sulfuric acid, which is removed from the porous carbon material.

Among conventional flue gas desulfurization apparatuses, some contain a catalyst unit formed of plate-like activated carbon fiber sheets and corrugated activated carbon fiber sheets, which are alternatingly juxtaposed. In such apparatuses, water is added dropwise to activated carbon fiber contained in the catalyst unit, and a discharge gas is caused to pass through conduits provided between the sheets, whereby a sulfur component is removed in the form of sulfuric acid. In order to enhance discharge gas purifying performance (desulfurization efficiency), water must be added to activated carbon fiber so that uniform water distribution is attained. In addition, in order to prevent an increase in the size of an auxiliary facility for supplying water, a minimum required amount of water must be evenly added to the activated carbon fiber.

In one method (known as a lime-gypsum method) for removing sulfur oxides by employment of a flue gas desulfurization apparatus, a sulfur component contained in a discharge gas is collected in gypsum form by use of limestone slurry or slaked lime slurry serving as an absorbent. In an alternative method called the dry adsorption method, activated carbon is used in dry format.

The aforementioned conventional lime-gypsum method includes spraying of limestone slurry or slaked lime slurry into a discharge gas, whereby humidifying and cooling of the discharge gas and absorption of $SO_x$ are performed simultaneously. Accordingly, a large amount of slurry must be circulated, thereby requiring power and a large amount of water for circulating the slurry. In addition, since the thus-formed gypsum is in slurry form, an apparatus for separating water from the slurry so as to collect gypsum is required. Thus, when the lime-gypsum method is employed, dimensions and complexity of the desulfurization facility unavoidably increase.

The dry adsorption method requires a large amount of heat for releasing an adsorbed sulfur component from activated carbon through heating. In addition, there arise problems such as disposal of the formed dilute sulfuric acid and loss of the employed adsorbent. Therefore, demand has arisen for a desulfurization apparatus which can produce sulfuric acid during desulfurization without requiring an absorbent for sulfur oxides or a large desulfurization facility.

In this connection, there has been proposed an apparatus for removing $SO_x$ contained in a discharge gas in which $SO_x$ contained in the discharge gas is adsorbed by a porous carbon material such as activated carbon fiber, a sulfur component is oxidized by oxygen contained in the discharge gas in the presence of the porous carbon material serving as a catalyst, and the oxidation product is absorbed in water, to thereby form sulfuric acid, which is removed from the porous carbon material (see Japanese Patent Application Laid-Open (kokai) No. 11-347350).

The above conventional flue gas desulfurization apparatus employing activated carbon fiber includes an activated carbon fiber board, disposed in an adsorption tower, for adsorbing $SO_x$ contained in a discharge gas. In the desulfurization apparatus, a discharge gas is fed from the bottom of the tower, and $SO_2$ is oxidized on the surface of the activated carbon fiber, to thereby form $SO_3$. The thus-formed $SO_3$ is reacted with supplied water, to thereby form sulfuric acid ($H_2S_4$).

A considerable amount of discharge gas is generated from a boiler combusting a fuel such as coal or heavy oil. Such a large amount of discharge gas must be treated continuously to thereby enhance desulfurization efficiency. In order to perform continuous operation, it is essential that a large adsorption tower be employed. However, there is desired an adsorption tower which attains higher desulfurization efficiency of activated carbon fiber with a desulfurization system of small size.

In order to effectively attain catalytic action, catalytic reaction conditions must be optimized, and $SO_3$ produced through oxidation of $SO_2$ contained in a discharge gas must be effectively removed by use of water. In addition, in order to avoid increase in size of an auxiliary water-supply facility, water must be distributed uniformly in the catalyst through addition of a minimum required amount of water.

When industrial water or similar water is supplied to the catalyst, the total cost of the system increases. Therefore, improvement in efficiency of the system is required.

In this connection, utilization of waste water produced from the system or similar water is a conceivable approach for solving the problem. However, when this approach is actually employed, catalyst activity problematically lowers.

Since water is needed for catalytic action, the catalyst must maintain an appropriate water content. When the catalyst is not sufficiently wet, the catalytic action cannot fully be attained, which is problematic. Particularly at the time of starting the desulfurization apparatus, poor wetting conditions are problematic.

When the aforementioned plants are stopped, water for humidifying-cooling and additional water are fed to a desulfurization apparatus, since hot airflow is continuously fed to the apparatus even after the boilers are stopped. In this case, since a discharge gas containing sulfur oxides is not fed to the desulfurization apparatus, the concentration of the formed sulfuric acid gradually lowers. When sulfuric acid having a concentration below a certain level is used to form gypsum, separation and collection of the product become difficult, which is problematic. Thus, conventionally, such low-concentration sulfuric acid which cannot be used to produce gypsum must be treated as industrial waste, which is also problematic.

In the case where dilute sulfuric acid is produced without producing gypsum, when the concentration of dilute sulfuric acid is excessively low, the size of the concentration facility must be increased, thereby problematically elevating the cost of the sulfuric acid production facility.

The present invention has been accomplished under the above-described circumstances. Thus, an object of the present invention is to provide a flue gas desulfurization apparatus comprising a catalyst unit formed of at least one activated carbon fiber board allowing uniform water distribution therein.

The present invention has been accomplished under the above-described circumstances. Thus, another object of the present invention is to provide a desulfurization method for removing sulfur oxides ($SO_x$) by evenly adding water to an activated carbon fiber board.

The present invention has been accomplished under the above-described circumstances. Thus, still another object of the present invention is to provide a desulfurization method which for removing sulfur oxides ($SO_x$) by evenly adding a minimum required amount of water to an activated carbon fiber board.

The present invention has been accomplished under the above-described circumstances. Thus, still another object of the present invention is to provide a flue gas desulfurization apparatus which discharges no industrial waste and which attains high efficiency.

The present invention has been accomplished under the above-described circumstances. Thus, still another object of the present invention is to provide a flue gas desulfurization apparatus which requires no absorbent for sulfur oxides, can be operated without a large desulfurization facility, and can produce high-concentration sulfuric acid during desulfurization; i.e., to provide a flue gas desulfurization apparatus which can reduce the amount of supplied water and which attains uniform water distribution.

The present invention has been accomplished under the above-described circumstances. Thus, still another object of the present invention is to provide a flue gas desulfurization apparatus which can perform desulfurization reaction at high efficiency by use of activated carbon fiber, which provides a simple desulfurization system, and which attains high efficiency and small size.

The present invention has been accomplished under the above-described circumstances. Thus, still another object of the present invention is to provide a flue gas desulfurization apparatus which assures high overall efficiency of a desulfurization system and which maintains desulfurization performance over a long period of time.

DISCLOSURE OF THE INVENTION

The present invention provides a flue gas desulfurization apparatus including a catalyst unit formed of at least one activated carbon fiber board and water-supply means for supplying, to the catalyst unit, water for forming sulfuric acid. The catalyst unit is provided in the apparatus in the form of a tower through which a discharge gas containing sulfur oxide passes, the water-supply means being provided above the catalyst unit or in an upper section of the unit and in the apparatus in the form of a tower. The activated carbon fiber board provided in the catalyst unit is formed by alternatingly juxtaposing one or more plate-like activated carbon fiber sheets and one or more corrugated activated carbon fiber sheets so as to provide vertically extending conduits, and the water-supply means comprises permeation means for supplying water to an upper section of the active carbon fiber board by the mediation of a capillary member.

With the above structure, when water is supplied, by the mediation of the permeation member, to the plate-like activated carbon fiber sheets and the corrugated activated carbon fiber sheets, the water is allowed to be present evenly over the entirety of the activated carbon fiber board of the catalyst unit.

Preferably, the capillary member of the permeation means is made of fabric.

In this case, costs can be reduced.

Preferably, the capillary member of the permeation means assumes the form of cord.

In this case, costs can be reduced.

The present invention also provides a flue gas desulfurization apparatus including a catalyst unit formed of at least one activated carbon fiber board, and water-supply means for supplying, to the catalyst unit, water for forming sulfuric acid. The catalyst unit is provided in the apparatus in the form of a tower through which a discharge gas containing sulfur oxide passes. The water-supply means is provided above the catalyst unit or in an upper section of the unit and in the apparatus in the form of a tower. The activated carbon fiber board provided in the catalyst unit is formed by alternatingly juxtaposing one or more plate-like activated carbon fiber sheets and one or more corrugated activated carbon fiber sheets so as to provide vertically extending conduits, and the water-supply means is spray means for directly spraying water in mist form to an upper portion of a surface of the activated carbon fiber board.

With the above structure, when water is supplied, by means of the spray means, directly to the plate-like activated carbon fiber sheets and the corrugated activated carbon fiber sheets, the water is allowed to be present evenly over the entirety of the activated carbon fiber board of the catalyst unit.

Preferably, the catalyst unit is formed of a plurality of activated carbon fiber boards which are vertically disposed, and the activated carbon fiber boards are linked via capillary means.

With the above structure, two stages of activated carbon fiber boards are vertically disposed for reducing the size of the apparatus or other reasons, and water is supplied, by the mediation of the capillary member, to the plate-like activated carbon fiber sheets and the corrugated activated carbon fiber sheets of each disposed activated carbon fiber board, without being affected by characteristics of the discharge gas such as flow rate. Thus, water is allowed to be present evenly over the entirety of the activated carbon fiber boards of a catalyst unit.

The present invention provides a desulfurization method including causing a discharge gas containing sulfur oxides to pass through a catalyst unit formed of at least one activated carbon fiber board and supplying water for forming sulfuric acid, characterized by comprising supplying water to the catalyst unit through a capillary phenomenon.

In this case, the desulfurization method attains removal of sulfur oxides by means of the activated carbon fiber board in which water is uniformly dispersed.

The present invention also provides a flue gas desulfurization apparatus including a catalyst unit formed of at least one activated carbon fiber board, and water-supply means for supplying, to the catalyst unit, water for forming sulfuric acid. The catalyst unit is provided in the apparatus in the form of a tower through which a discharge gas containing sulfur oxide passes, the water-supply means being provided in the apparatus in the form of a tower. The invention comprises humidifying-cooling means for cooling and humidifying the discharge gas outside or inside the apparatus in the form of a tower and a liquid-feed line for feeding, to the humidifying-cooling means, dilute sulfuric acid which has been collected in the apparatus in the form of a tower and has a low concentration equal to or lower than a predetermined sulfuric acid concentration.

Preferably, the dilute sulfuric acid having a low concentration equal to or lower than a predetermined sulfuric acid concentration has a concentration of 0.5% or lower.

Preferably, the dilute sulfuric acid having a low concentration equal to or lower than a predetermined sulfuric acid concentration is collected after desulfurization is stopped.

Preferably, the desulfurization apparatus further includes an inlet for introducing the discharge gas containing sulfur oxide into a lower section of the apparatus in the form of a tower, an outlet for discharging the discharge gas in an upper section of the apparatus, and an apparatus for supplying water for producing sulfuric acid disposed above the catalyst unit and in the tower.

The present invention provides a flue gas desulfurization system characterized by comprising any one of the aforementioned flue gas desulfurization apparatuses, a gypsum reaction tank for yielding gypsum slurry by reacting dilute sulfuric acid fed from the flue gas desulfurization apparatus with lime slurry, and a dewatering apparatus for separating water from gypsum slurry produced in the gypsum reaction tank, to thereby yield gypsum.

The present invention also provides a flue gas desulfurization system characterized by comprising any one of the aforementioned flue gas desulfurization apparatuses and a condensation tank for condensing dilute sulfuric acid produced by means of the desulfurization apparatus.

Preferably, the discharge gas is discharged from a boiler, a gas turbine, an engine, or any of a variety of incinerators, and the flue gas desulfurization system further comprises soot-removing means for removing soot contained in the discharge gas.

The present invention provides a method for operating a flue gas desulfurization apparatus including starting, stopping, and restarting the flue gas desulfurization apparatus containing a catalyst unit formed of at least one activated carbon fiber board, and water-supply means for supplying, to the catalyst unit, water for forming sulfuric acid. The catalyst unit is provided in the apparatus in the form of a tower through which a discharge gas containing sulfur oxide passes, the water-supply means being provided in the apparatus in the form of a tower. The method comprises performing humidifying-cooling and cooling through addition of water until the discharge gas is cooled to approximately 70° C., collecting low-concentration dilute sulfuric acid, and upon restarting of the apparatus, supplying the low-concentration dilute sulfuric acid instead of water for humidifying-cooling employed in humidifying-cooling means or supplying the low-concentration dilute sulfuric acid instead of water.

Preferably, the method for operating the flue gas desulfurization apparatus comprises supplying, upon restarting of the apparatus, the low-concentration dilute sulfuric acid instead of water for humidifying-cooling employed in humidifying-cooling means or supplying the low-concentration dilute sulfuric acid instead of water, and collecting dilute sulfuric acid having a concentration equal to or higher than a predetermined concentration, to thereby obtain a sulfuric acid product.

Alternatively, preferably, the method for operating the flue gas desulfurization apparatus comprises supplying, upon restarting of the apparatus, the low-concentration dilute sulfuric acid instead of water for humidifying-cooling employed in humidifying-cooling means or supplying the low-concentration dilute sulfuric acid instead of water, collecting dilute sulfuric acid having a concentration equal to or higher than a predetermined concentration, and reacting the resultant dilute sulfuric acid with lime slurry, to thereby obtain gypsum.

Conventionally, dilute sulfuric acid produced in a desulfurization apparatus and having a concentration which decreases during a halt of a plant has been treated as industrial waste. However, according to the above methods, such dilute sulfuric acid can be employed as cooling liquid for a humidifying-cooling apparatus, whereby waste treatment is omitted. In addition, the concentration of the dilute sulfuric acid is elevated by spraying the sulfuric acid as humidifying-cooling liquid into a discharge gas and subjecting the same to desulfurization again in the desulfurization tower. The resultant concentration-elevated sulfuric acid is reacted with lime slurry, to thereby produce a good gypsum product.

The present invention also provides a flue gas desulfurization apparatus including a catalyst unit formed of at least one activated carbon fiber board, and water-supply means for supplying, to the catalyst unit, water for forming sulfuric acid. The catalyst unit is provided in the apparatus in the form of a tower through which a discharge gas containing sulfur oxide passes, the water-supply means being provided in the apparatus in the form of a tower. The apparatus in the form of a tower has a humidifying tank for humidifying a catalyst therein, the tank containing the catalyst unit therein.

Preferably, a plurality of stages of catalyst units are stacked by means of a supporting apparatus.

Preferably, the desulfurization apparatus further comprises an inlet for introducing the discharge gas containing sulfur oxide into a lower section of the apparatus in the form of a tower, an outlet for discharging the discharge gas in an upper section of the apparatus and an apparatus for supplying water for producing sulfuric acid disposed above the catalyst unit.

The present invention provides a flue gas desulfurization system characterized by comprising any one of the aforementioned flue gas desulfurization apparatuses, a gypsum reaction tank for yielding gypsum slurry by reacting dilute sulfuric acid fed from the flue gas desulfurization apparatus with lime slurry, and a dewatering apparatus for separating water from gypsum produced in the gypsum reaction tank.

The present invention also provides a flue gas desulfurization system characterized by comprising any one of the aforementioned flue gas desulfurization apparatuses and a condensation tank for condensing dilute sulfuric acid produced by means of the desulfurization apparatus.

Preferably, the discharge gas is discharged from a boiler, a gas turbine, an engine, or any of a variety of incinerators, and the flue gas desulfurization system further comprises soot-removing means for removing soot contained in the discharge gas.

The present invention provides a method for starting a flue gas desulfurization apparatus containing a catalyst unit formed of at least one activated carbon fiber board, and water-supply means for supplying, to the catalyst unit, water for forming sulfuric acid, the catalyst unit being provided in the apparatus in the form of a tower through which a discharge gas containing sulfur oxide passes. The water-supply means is provided in the apparatus in the form of a tower. The method comprises humidifying the catalyst unit in advance, placing in the apparatus in the form of a tower the catalyst which has been humidified, and subsequently starting the apparatus.

The present invention provides a method for starting a flue gas desulfurization apparatus containing a catalyst unit formed of at least one activated carbon fiber board, and water-supply means for supplying, to the catalyst unit, water for forming sulfuric acid. The catalyst unit is provided in the apparatus in the form of a tower through which a discharge gas containing sulfur oxide passes. The water-supply means is provided in the apparatus in the form of a tower. The method comprises freezing the catalyst unit in advance, placing in the apparatus in the form of a tower the catalyst which has been frozen, and subsequently starting the apparatus.

The present invention provides a method for starting the aforementioned flue gas desulfurization apparatus characterized by supplying steam or water to the humidifying tank containing the catalyst unit, to thereby humidify the catalyst unit, and subsequently starting the apparatus.

Preferably, the humidified catalyst unit retains water in an amount of at least twice the weight of the unit. With the above structure, favorable humidifying conditions in the desulfurization apparatus can be effectively attained upon starting the apparatus. Thus, activated carbon fiber contained in the catalyst unit can be sufficiently humidified, whereby effective catalytic activity at an initial stage is provided and deterioration of the catalyst during subsequent operation is prevented.

The present invention provides a flue gas desulfurization apparatus comprising a plurality of catalyst stages provided in the apparatus in the form of a tower through which a discharge gas containing sulfur oxide passes, and water-supplying means for supplying water for producing sulfuric acid to the catalyst stages, each of the catalyst stages being formed of at least one activated carbon fiber board. The water-supply means being provided above the uppermost catalyst stage and in the apparatus in the form of a tower.

With the above structure, In this case, water droplets are caused to dispersed, during falling between catalyst stages, to thereby attain substantially uniform water distribution. Thus, there can be provided a flue gas desulfurization apparatus containing catalyst means formed of at least one activated carbon fiber board allowing a uniform water distribution.

The present invention provides a flue gas desulfurization apparatus characterized by comprising a plurality of catalyst stages provided in the apparatus in the form of a tower through which a discharge gas containing sulfur oxide passes, and water-supplying means for supplying water for producing sulfuric acid to each catalyst stage. The catalyst stages are formed of at least one activated carbon fiber board, the water-supply means being provided above each catalyst stage and in the apparatus in the form of a tower.

With the above structure, a required amount of water can be supplied to a portion where water is needed, to thereby attain uniform water distribution. Thus, through addition of a minimum required amount of water, there can be provided a flue gas desulfurization apparatus containing catalyst means formed of at least one activated carbon fiber board allowing uniform water distribution.

Preferably, the flue gas desulfurization apparatus further comprises oxygen concentration detection means for detecting oxygen concentration of a discharge gas passing through the apparatus in the form of a tower, sulfur oxide concentration detection means for detecting sulfur oxide concentration on a gas-outlet side of each catalyst stage and on a gas-inlet side of the catalyst stage on the uppermost stream side, the catalyst stages being provided in the apparatus in the form of a tower, and control means for controlling supply conditions of water supplied from each water-supply means on the basis of detected information provided from the oxygen concentration detection means and the sulfur oxide concentration detection means.

With the above structure, an optimum amount of water can be distributed to each catalyst means in accordance with the sulfur oxide concentration and the oxygen concentration. Thus, a required amount of water can be supplied to required catalyst means, and efficiency for removal of sulfur oxides can be maintained at a high level through addition of a minimum required amount of water.

Preferably, the control means includes means for reducing the amount of water supplied from each water-supply means in accordance with an increase in oxygen concentration as detected by the oxygen concentration detection means and for increasing the amount of water supplied from each water-supply means in accordance with an increase in sulfur oxide concentration as detected by the sulfur oxide concentration detection means.

In this case, water can be supplied in an optimum amount for maintaining excellent efficiency for removal of sulfur oxides.

Preferably, the control means includes means for storing a predetermined value of sulfur oxide concentration on an outlet side of each catalyst stage, and for controlling supply conditions of water supplied from each water-supply means on the basis of comparison of the stored predetermined value with information detected by the sulfur oxide concentration detection means, to thereby maintain the sulfur oxide concentration on an outlet side of each catalyst stage at the predetermined value.

In this case, a required amount of water can be supplied to a target catalyst stage through addition of a minimum required amount of water while sulfur oxide concentration is maintained at a predetermined level. Thus, excellent efficiency for removal of sulfur oxides can be maintained through addition of a minimum required amount of water.

The present invention also provides a flue gas desulfurization apparatus including a catalyst unit formed of at least one activated carbon fiber board, and water-supply means for supplying, to the catalyst unit, water for forming sulfuric acid. The catalyst unit is provided in the apparatus in the form of a tower through which a discharge gas containing sulfur oxide passes, the water-supply means being provided in the apparatus in the form of a tower. The apparatus comprises a humidifying-cooling apparatus for humidifying and cooling the discharge gas for feeding to the desulfurization apparatus in the form of a tower. A supernatant obtained from gypsum slurry is supplied, as water for humidifying-cooling, to the humidifying-cooling apparatus.

Preferably, the supernatant is obtained from a gypsum settling tank.

Preferably, the supernatant is separated from the gypsum settling tank by means of a stationary tank, a cyclator, a filter, or a combination thereof.

Preferably, the desulfurization apparatus includes a cooling tank for cooling the supernatant obtained from the gypsum settling tank.

Preferably, the desulfurization apparatus includes a salt-out tank for salting-out a salt component contained in the supernatant obtained from the gypsum settling tank.

Preferably, the cooling temperature during humidifying-cooling is 40 to 60° C.

Preferably, the mist contained in the discharge gas which has been humidified and cooled has a particle size of 50 to 150 $\mu$m.

Preferably, the desulfurization apparatus further comprises an inlet for introducing the discharge gas containing sulfur oxide into a lower section of the apparatus in the form of a tower, an outlet for discharging the discharge gas in an upper section of the apparatus, an apparatus for supplying water for producing sulfuric acid disposed above the catalyst unit, and a humidifying-cooling apparatus for humidifying and cooling the discharge gas for feeding to the apparatus in the form of a tower.

Preferably, the humidifying-cooling apparatus is provided on the upstream side of the apparatus in the form of a tower.

Preferably, the humidifying-cooling apparatus is provided on the upstream side of the catalyst unit contained in the apparatus in the form of a tower.

The present invention provides a flue gas desulfurization system characterized by comprising the aforementioned flue gas desulfurization apparatus, a gypsum reaction tank for depositing gypsum by feeding lime slurry to dilute sulfuric acid discharged from the flue gas desulfurization apparatus, a stationary tank for settling the gypsum, and a dewatering apparatus for separating water from gypsum slurry, to thereby yield gypsum.

Accordingly, the amount of water supplied from the outside of the apparatus for use in humidifying-cooling can be reduced, since a humidifying-cooling apparatus for cooling and humidifying the discharge gas for feeding to the desulfurization apparatus in the form of a tower is provided in the flue gas desulfurization apparatus of the present invention including a catalyst unit formed of at least one activated carbon fiber board, and water-supply means for supplying, to the catalyst unit, water for forming sulfuric acid, the catalyst unit being provided in the apparatus in the form of a tower through which a discharge gas containing sulfur oxide passes, the water-supply means being provided in the apparatus in the form of a tower.

In addition, a re-processed supernatant obtained through stationary settling of a supernatant obtained from gypsum slurry is used as water to be supplied to the humidifying-cooling apparatus, so that adhesion of gypsum or a similar substance on activated carbon fiber constituting the catalyst unit can be prevented. Thus, desulfurization performance can be maintained for a long period of time without variation or deterioration of desulfurization efficiency.

BRIEF DESCRIPTION OF THE DRAWINGS

FIG. 6 is a cross-sectional view showing activated carbon fiber boards according to other embodiments.

FIG. 15 is a structural diagram of a flue gas desulfurization apparatus according to a third embodiment.

FIG. 28 is a graph showing a time-elapsed change in sulfur oxide concentration.

MODES FOR CARRYING OUT THE INVENTION

The present invention will next be described in more detail with reference to the attached drawings.

Figure 1:
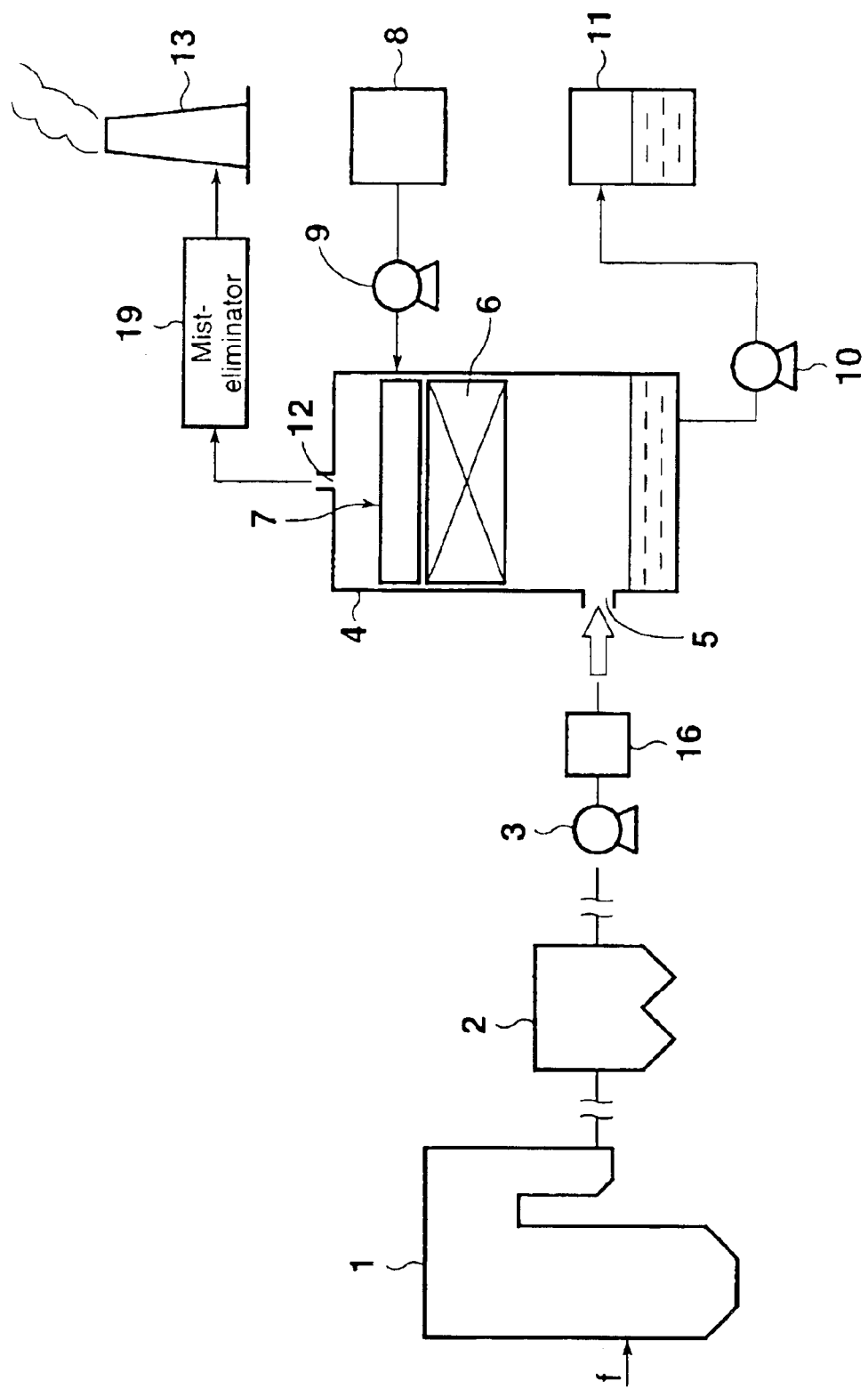
FIG. 1 is a system configuration of a discharge gas process system employing the flue gas desulfurization apparatus according to a first embodiment of the present invention.

With reference to FIG. 1, a discharge gas process system employing the flue gas desulfurization apparatus according to a first embodiment of the present invention will be described.

As shown in FIG. 1, a boiler 1, for example, a boiler for generating steam for driving a steam turbine (not illustrated) of a thermal power plant, combusts fuel f (e.g., coal or heavy oil) in its furnace. A discharge gas generated from the boiler 1 contains sulfur oxides ($SO_x$). The discharge gas undergoes a $NO_x$ removal process by means of an $NO_x$ removal unit (not illustrated), is cooled by means of a gas heater, and subsequently undergoes a soot removal process by means of a soot collector 2.

The soot-removed discharge gas is fed, by means of a feed pump 3, to a humidifying-cooling apparatus 16, where water (including dilute sulfuric acid) is added, to thereby yield a discharge gas in saturated vapor form. The thus-humidified discharge gas may contain mist. The discharge gas in saturated vapor form produced in the humidifying-cooling apparatus 16 is fed to a desulfurization tower 4 (desulfurization apparatus in the form of a tower) via an inlet 5 provided in a lower section of the tower. The desulfurization tower 4 contains therein a catalyst unit 6 formed of at least one activated carbon fiber board, and water for producing sulfuric acid is supplied to the catalyst unit 6 via a capillary member 7 provided above the catalyst unit. Water is supplied to the capillary member 7 from a water tank 8 by use of a pump 9. Water-supply means includes the capillary member 7, the water tank 8, and the pump 9.

The discharge gas is introduced from the lower section of the tower and caused to pass through the catalyst unit 6 onto which water has been supplied, whereby $SO_x$ contained in the discharge gas is removed through reaction. The discharge gas which has passed through the catalyst unit 6 is discharged from an outlet 12, and mist contained in the discharged gas is removed by a mist-eliminator 19, whereby generation of white smoke is suppressed. The thus-treated discharge gas is released to the air through a smokestack 13. The mist-eliminator 19 may be omitted.

On a surface of the activated carbon fiber board contained in the catalyst layer 6, desulfurization proceeds in accordance with, for example, a following reaction mechanism which includes:
(1) adsorption of sulfur dioxide ($SO_2$) by the activated carbon fiber board contained in the catalyst layer 6;
(2) oxidation of the adsorbed sulfur dioxide ($SO_2$) with oxygen ($O_2$) (may be supplied separately) contained in the discharge gas, to thereby form sulfur trioxide ($SO_3$);
(3) dissolution of the resultant sulfur trioxide ($SO_3$) in water ($H_2O$), to thereby form sulfuric acid ($H_2SO_4$); and
(4) release of the resultant sulfuric acid ($H_2SO_4$) from the activated carbon fiber board.

The overall reaction is expressed as follows.

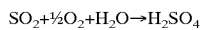

$$SO_2 + \tfrac{1}{2}O_2 + H_2O \rightarrow H_2SO_4$$

The thus-released sulfuric acid ($H_2SO_4$) is dilute sulfuric acid and is discharged into a sulfuric acid tank 11 via a discharge pump 10. As described above, desulfurization of the discharge gas is performed by causing, by means of the catalyst unit 6 for oxidation, absorption of sulfur dioxide ($SO_2$) contained in the discharge gas, reacting the oxidation product with water ($H_2O$), to thereby form sulfuric acid ($H_2SO_4$), and releasing the sulfuric acid from the catalyst unit.

Figure 2:
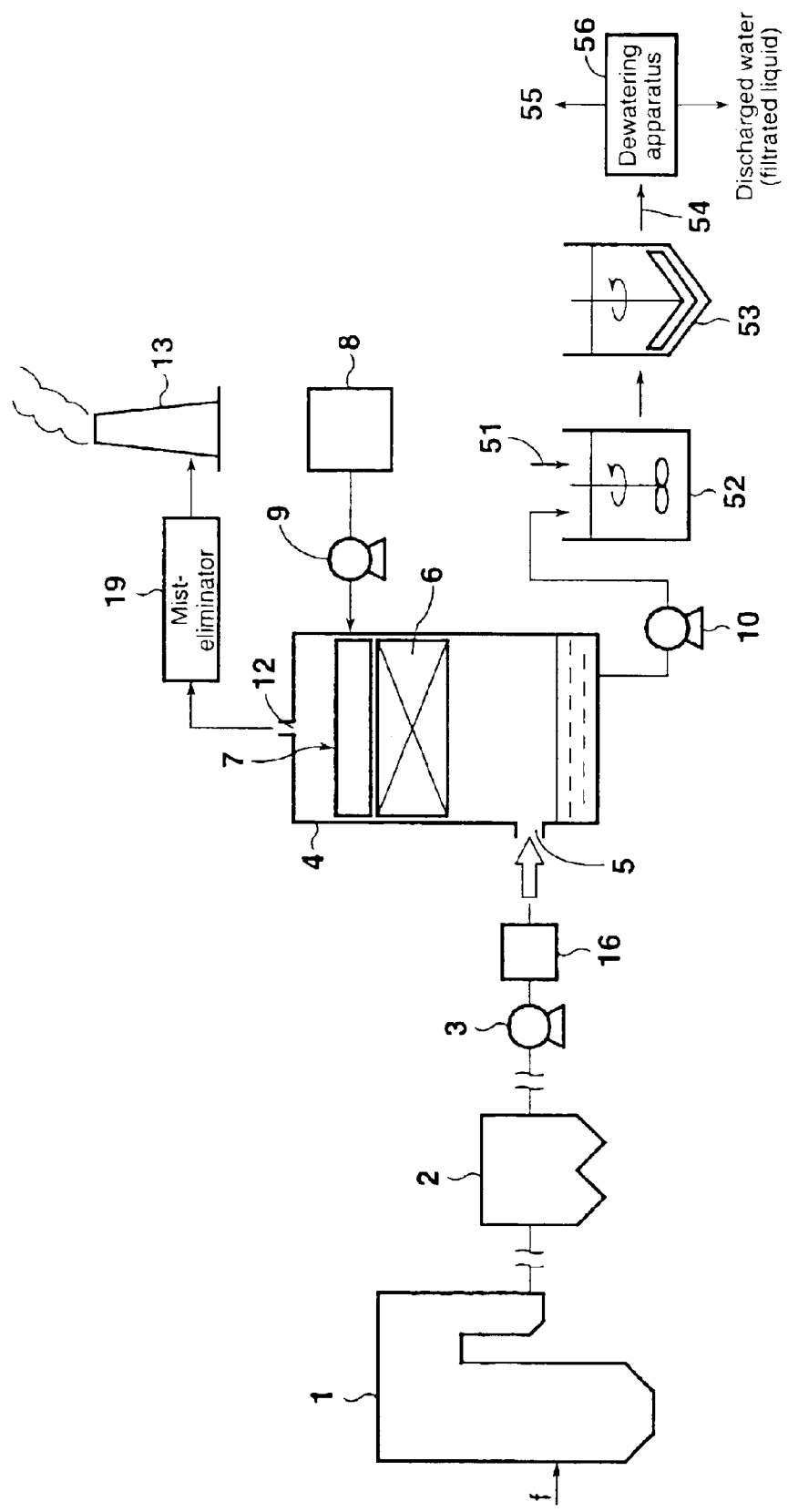
FIG. 2 is a system configuration of a discharge gas process system according to another embodiment of the present invention.

With reference to FIG. 2, a discharge gas process system according to another embodiment of the present invention will be described. Herein, the same structural members as employed in the discharge gas process system shown in FIG. 1 are denoted by the same reference numerals, and repeated descriptions thereof are omitted.

According to the discharge gas process system shown in FIG. 2, sulfur oxides contained in a discharge gas are removed by means of a desulfurization apparatus, whereby sulfuric acid is formed, and lime slurry is fed to the resultant sulfuric acid, to thereby produce gypsum.

As shown in FIG. 2, the system includes a gypsum reaction tank 52 for storing dilute sulfuric acid fed from a desulfurization tower 4 via a discharge pump 10 and for depositing gypsum by reaction with supplied lime slurry 51. In addition, a settling tank (thickener) 53 is also provided for settling gypsum deposited in the gypsum reaction tank 52. Gypsum slurry 54 formed in the settling tank (thickener) 53 is transferred to a dewatering apparatus 56, where water is removed from the gypsum slurry, to thereby yield gypsum 55.

In the discharge gas process system shown in FIG. 1, sulfuric acid obtained through desulfurization is used as a sulfuric acid product. However, in the discharge gas process system shown in FIG. 2, lime slurry 51 is fed to the produced sulfuric acid, thereby forming gypsum slurry 54, followed by dehydration, to thereby yield a gypsum product 55.

The structure of the activated carbon fiber board contained in the catalyst unit 6 will be described with reference to FIGS. 3 to 7.

An activated carbon fiber board 20 is formed by alternatingly juxtaposing plate-like activated carbon fiber sheets 21 and corrugated (continuous V-shaped waves) activated carbon fiber sheets 22. Spaces extending straight and provided between two sheets serve as conduits 15, with the conduits 15 extending vertically. The plate-like activated carbon fiber sheets 21 and the corrugated activated carbon fiber sheets 22 are formed by mixing cotton-form activated carbon fiber (e.g., pitch-derived or phenol-derived carbon fiber) with a binder and forming the mixture into a sheet. In the case where the corrugated activated carbon fiber sheet 22 is formed, the sheet is worked by use of a corrugator. Subsequently, the thus-formed sheets are heated in a non-oxidizing atmosphere (e.g., nitrogen) at high temperature (e.g., 600° C. to 1,200° C.), to thereby yield activated carbon fiber sheets for use in desulfurization. Briefly, a highly hydrophobic surface of activated carbon fiber is provided through heat treatment, so as to readily adsorb sulfur dioxide ($SO_2$) and rapidly release formed sulfuric acid ($H_2SO_4$) from activated carbon fiber.

No particular limitation is imposed on the type of activated carbon fiber employed in the present invention, so long as the activated carbon fiber exerts the aforementioned catalytic action. Examples include pitch-derived activated carbon fiber, polyacrylonitrile activated carbon fiber, phenol-derived activated carbon fiber, and cellulose-derived activated carbon fiber.

Production of the activated carbon fiber board will next be described in detail.

Phenol-derived activated carbon fiber (Kuractive-20, product of Kuraray Chemical Co., Ltd.) is fired at 900 to 1,200° C. in a nitrogen atmosphere for one hour. Polyacrylonitrile activated carbon fiber (FX-600, product of Toho Rayon Co., Ltd.) is fired at 900 to 1,200° C. in a nitrogen atmosphere for one hour.

The thus-heat-treated plate-like activated carbon fiber sheets 21 and corrugated activated carbon fiber sheets 22 are alternatingly juxtaposed, and the peak of each corrugated activated carbon fiber sheet 22 is joined to the plate-like activated carbon fiber sheet 21 through melt adhesion of the binder, to thereby produce a carbon fiber board module of predetermined size. Since the peak of each corrugated activated carbon fiber sheet 22 is joined to the plate-like activated carbon fiber sheet 21 through melt adhesion of the binder, no additional adhesive, such as an organic substance, is used. Thus, adverse effect of the adhesive on desulfurization reaction is eliminated, and reliability of joining is enhanced, thereby eliminating the effect of pressure loss.

In one mode, four modules of the activated carbon fiber board 20 are juxtaposed such that the conduits 15 are disposed vertically, to thereby yield one unit. Two units are stacked, and the stacked units are placed and immobilized in a casing. Briefly, a plurality of activated carbon fiber boards 20 are disposed and stacked in a vertical direction, to thereby provide the catalyst unit 6. Thus, the size of each activated carbon fiber board 20 can be reduced, thereby facilitating assembly of the catalyst unit.

Figure 4:
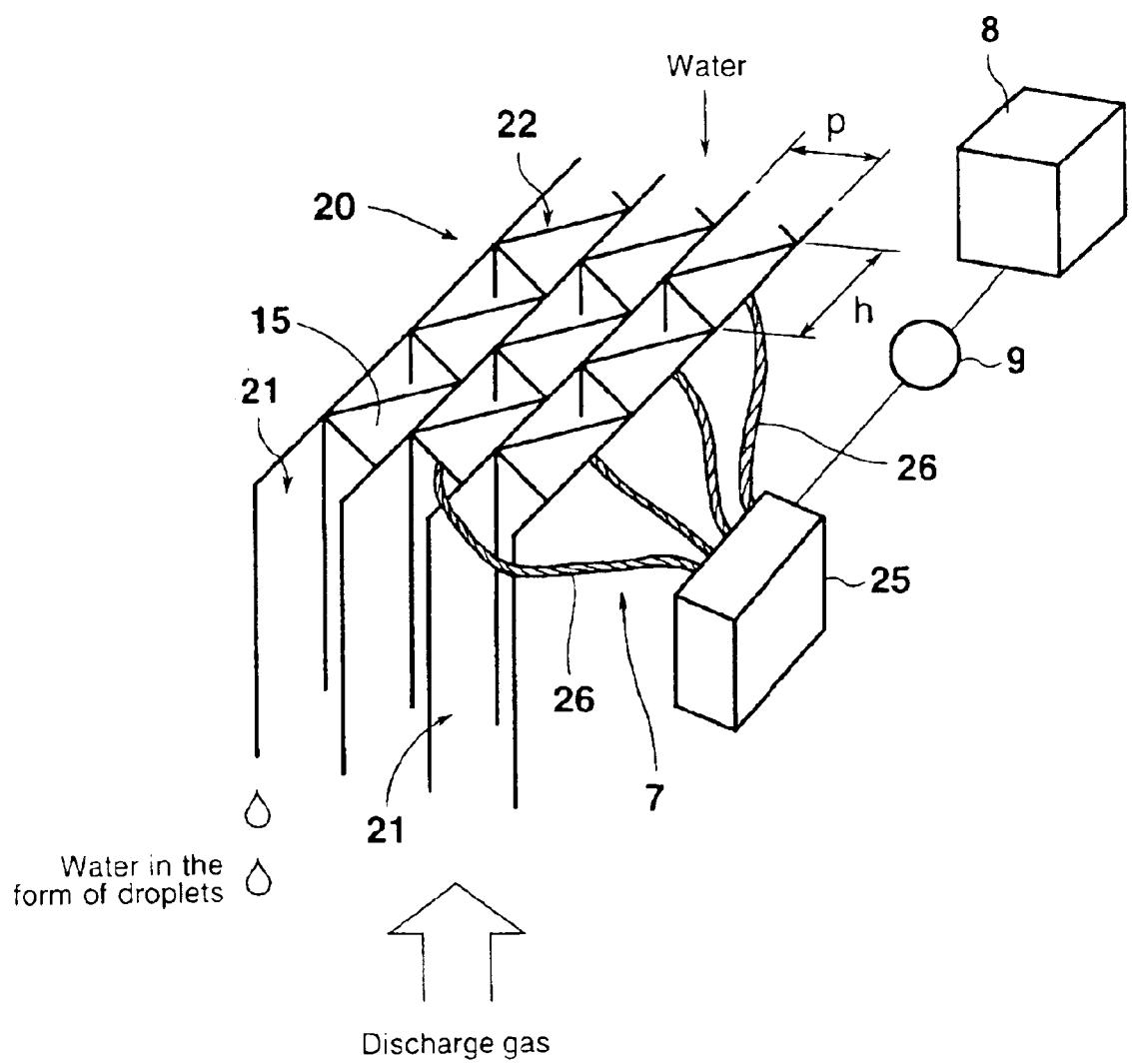
FIG. 4 is a perspective view showing a portion of an upper section of an activated carbon fiber board.

As shown in FIG. 4, the pitch p between plate-like activated carbon fiber sheets 21 is predetermined to be, for example, approximately 4 mm, and the width h of each protruded portion of the corrugated activated carbon fiber board 22 is predetermined to be, for example, approximately 10 mm. From a position above the activated carbon fiber boards, water is sprayed thereonto in the form of droplets approximately 200 µm in size, and a discharge gas is introduced from a position below the activated carbon fiber boards. Water which has passed through the activated carbon fiber boards 20 falls, in the form of droplets of about some mm in size, to the bottom of the desulfurization tower 4. The discharge gas passes through comparatively narrow conduits 15 provided by alternatingly juxtaposing the plate-like activated carbon fiber sheets 21 and corrugated activated carbon fiber sheets 22. Thus, an increase in pressure loss can be suppressed.

$SO_3$ formed through oxidation of $SO_2$ on the surface of activated carbon fiber is transformed into sulfuric acid by water, and the sulfuric acid is discharged. When the amount of water is insufficient, discharge of sulfuric acid cannot be attained and subsequent oxidation of $SO_2$ is insufficient, whereas when the amount of water is excessive, the yielded sulfuric acid is diluted. Furthermore, when the amount of water further increases, for example, in the case where the activated carbon fiber is covered with a thin layer or a wall of water which covers active sites of the activated carbon fiber, such activated carbon fiber loses catalytic action of oxidizing $SO_2$, thereby failing to attain desulfurization or deteriorating desulfurization efficiency.

Therefore, the amount of water supplied when a discharge gas comes into contact with the activated carbon fiber boards 20 contained in the catalyst unit 6 is predetermined such that water is sprayed thereonto in the form of droplets of approximately 200 µm in size from a position above the activated carbon fiber boards 20, and such that water which has passed through the activated carbon fiber boards 20 falls, in the form of droplets of about some mm in size, to the bottom of the desulfurization tower 4. Accordingly, water falls intermittently in the form of spherical droplets, although falling conditions depend on the conditions of the discharge gas. Thus, water can be supplied to the surface of activated carbon fiber in a sufficient, yet not excessive amount, and sulfuric acid can be released at high efficiency. As a result, desulfurization of a discharge gas can be effectively performed.

As shown in FIG. 6(A), the corrugated activated carbon fiber sheet 31 may be formed so as to have a continuous U-shape pattern, and a plurality of the corrugated activated carbon fiber sheets 31 and plate-like activated carbon fiber sheets 21 are alternatingly juxtaposed such that the U-shape patterns are oriented in the same direction. Alternatively, as shown in FIG. 6(B), a plurality of the corrugated activated carbon fiber sheets 31 and plate-like activated carbon fiber sheets 21 are alternatingly juxtaposed such that the orientation of the U-shape pattern is alternatingly disposed. Alternatively, as shown in FIG. 6(C), minute raised/dented patterns 32 may be provided in the surface of the corrugated activated carbon fiber sheets 31.

Figure 7:
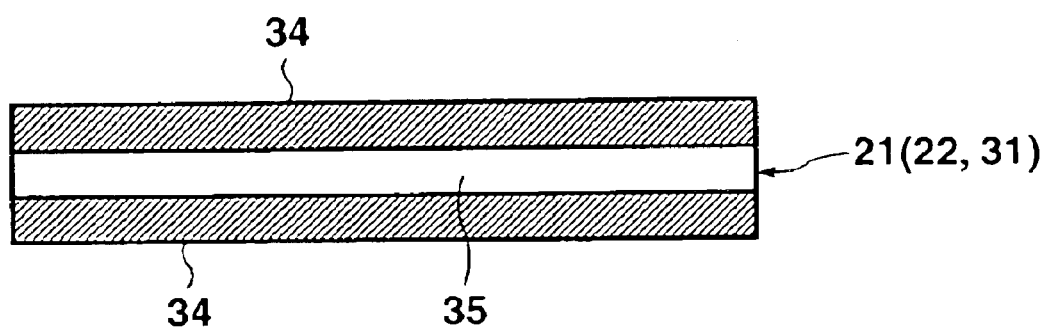
FIG. 7 is a cross-sectional view showing an activated carbon fiber sheet.

As illustrated in FIG. 7, a plate-like activated carbon fiber sheet 21 and corrugated activated carbon fiber sheets 22 and 31 are produced by tightly attaching a fired carbon sheet 35 on each side of a core material 34, to thereby form a laminated board. The core material 34 may be omitted.

Figure 3:
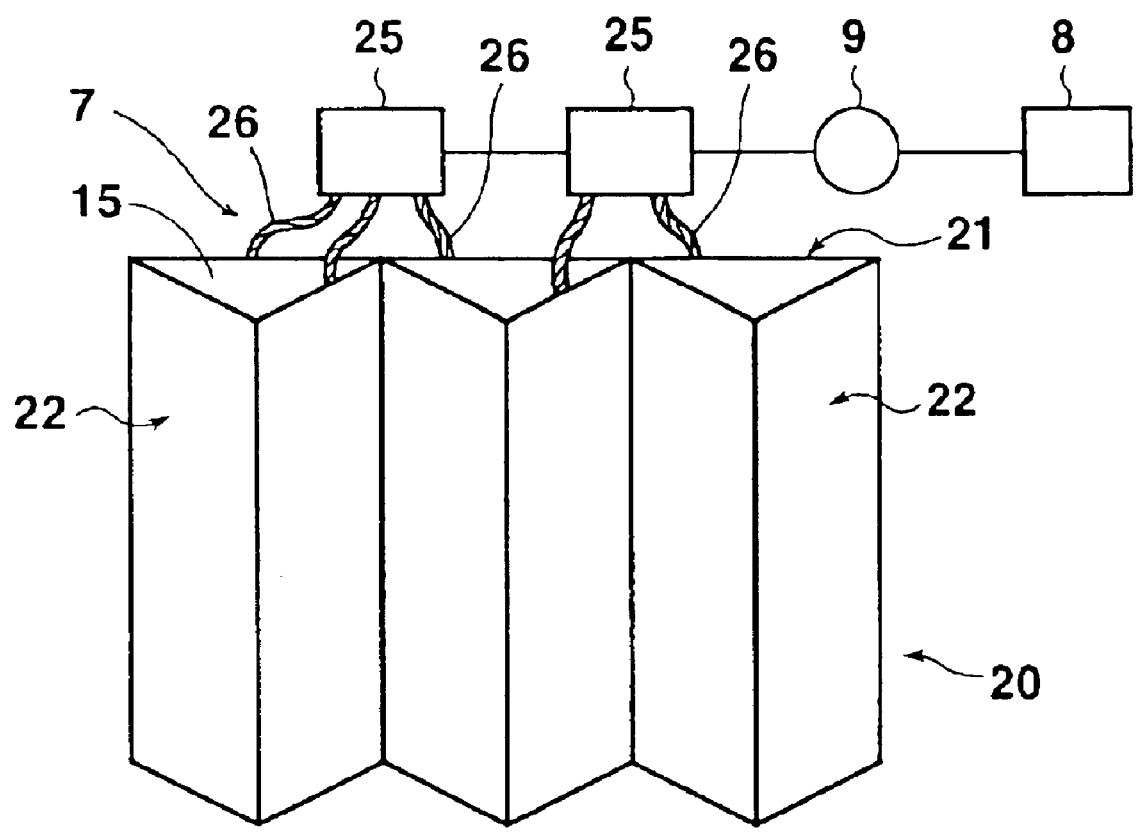
FIG. 3 is an elevation showing an essential portion of an activated carbon fiber board for constituting a catalyst unit.

With reference to FIGS. 3 and 4, the structure of the capillary member 7 for supplying water to the activated carbon fiber board 20 will next be described.

As shown in FIGS. 3 and 4, water reservoirs 25 are provided in the vicinity of the activated carbon fiber board 20 so as to receive water fed from a water tank 8 via a pump 9. A cord 26 serving as an element of a capillary member is provided from each water reservoir 25 to an upper section of a plate-like activated carbon fiber sheet 21 and that of a corrugated activated carbon fiber sheet 22, so as to supply water through a capillary phenomenon. Water reserved in each reservoir 25 is supplied directly to the plate-like activated carbon fiber sheet 21 and the corrugated activated carbon fiber sheet 22 by permeating the cord 26. Thus, water permeates all the surfaces of carbon sheets facing the conduits 15 so as to attain uniform water distribution.

The cord 26 may be provided around a portion along the upper edge face (upper ends of the conduits 15) of the activated carbon fiber board 20.

In this case, water can be supplied, by the mediation of the cord 26, to a plate-like activated carbon fiber sheet 21 and a corrugated activated carbon fiber sheet 22 regardless of the characteristics of the discharge gas, such as flow rate. Thus, water can be supplied to the entirety of the activated carbon fiber board 20 so as to attain uniform water distribution, and the catalyst unit 6 formed of the activated carbon fiber board 20 can be provided. Use of the cord 26 can suppress cost.

As a practical matter, water reservoirs 25 and the cords 26 are provided at positions in the catalyst unit 6 such that pressure loss of the discharge gas is prevented.

Regarding the capillary member, an upper section itself of a plate-like activated carbon fiber sheet 21 and that of a corrugated activated carbon fiber sheet 22 may serve as the capillary member, when water is supplied directly, by spray means such as a sprinkler or a pipe-form shower, to the upper section of a plate-like activated carbon fiber sheet 21 and that of a corrugated activated carbon fiber sheet 22. When the activated carbon fiber boards 20 are built in a frame body, the frame body itself may serve as a pipe-form shower. When water is supplied, by means of a sprinkler or a pipe-form shower, to the upper section of a plate-like activated carbon fiber sheet 21 and that of a corrugated activated carbon fiber sheet 22, smooth water supply can be attained through provision of a baffle plate or a similar member so as to prevent scattering of water due to flow of the discharge gas coming from a lower section.

Figure 8:
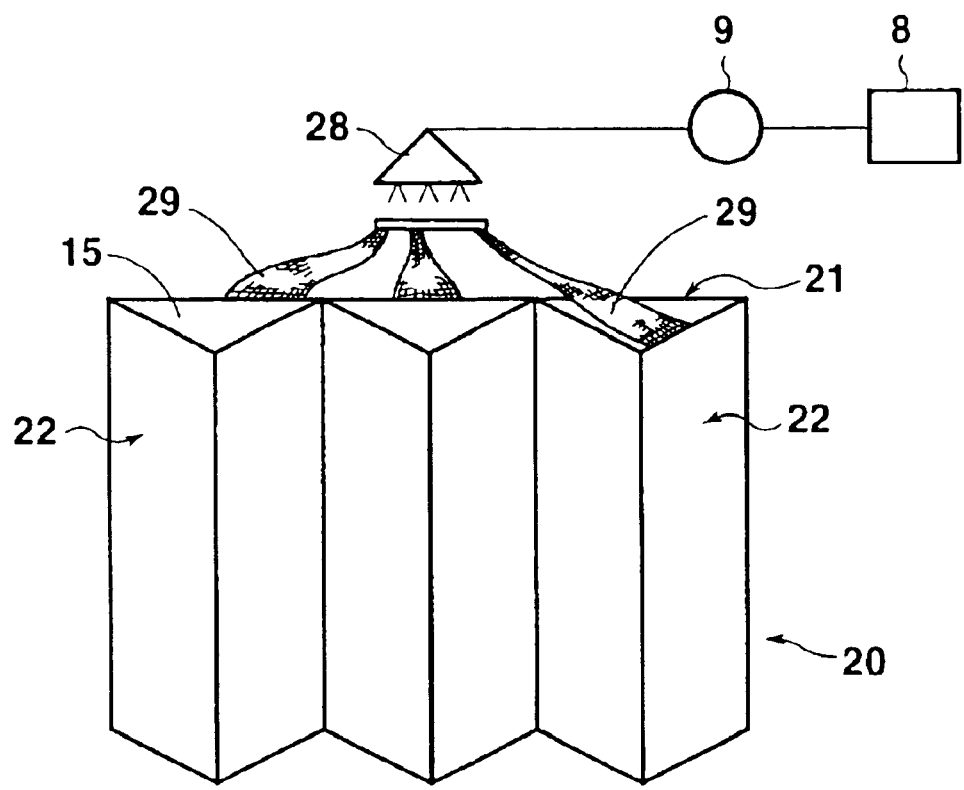
FIG. 8 is an elevation showing an essential portion of an activated carbon fiber board equipped with a capillary member according to another embodiment.

With reference to FIG. 8, a capillary member according to another embodiment of the present invention will be described. FIG. 8 is an elevation showing an essential portion of an activated carbon fiber board equipped with a capillary member according to another embodiment. Herein, the same structural members as shown in FIG. 3 are denoted by the same reference numerals, and repeated descriptions thereof are omitted.

As shown in FIG. 8, a spray nozzle 28 is provided in the vicinity of the activated carbon fiber board 20, and water is fed from a water tank 8 and a pump 9 to the nozzle. Fabric 29 in the form of, for example, a slip serving as a structural element of a capillary member is provided under the spray nozzle 28. A first edge of the fabric member 29 is connected to an upper section of a plate-like activated carbon fiber sheet 21 and that of a corrugated activated carbon fiber sheet 22. Water is sprayed from the nozzle 28 onto the fabric member 29, and is supplied directly to the plate-like activated carbon fiber sheet 21 and the corrugated activated carbon fiber sheet 22 by permeating the fabric member 29. Thus, water permeates the entirety of carbon fiber sheets facing the conduits 15 attaining uniform water distribution.

The fabric member 29 may be provided around a portion along the upper edge face (upper ends of the conduits 15) of the activated carbon fiber board 20.

In this case, water is supplied, by the mediation of the fabric 29, to a plate-like activated carbon fiber sheet 21 and a corrugated activated carbon fiber sheet 22 of each disposed carbon fiber board, without being affected by characteristics of the discharge gas such as flow rate. Thus, water can be supplied to the entirety of the activated carbon fiber boards 20 so as to attain uniform water distribution, and a catalyst unit 6 formed of the activated carbon fiber boards 20 can be provided. Use of the fabric 29 can reduce the cost.

Figure 9:
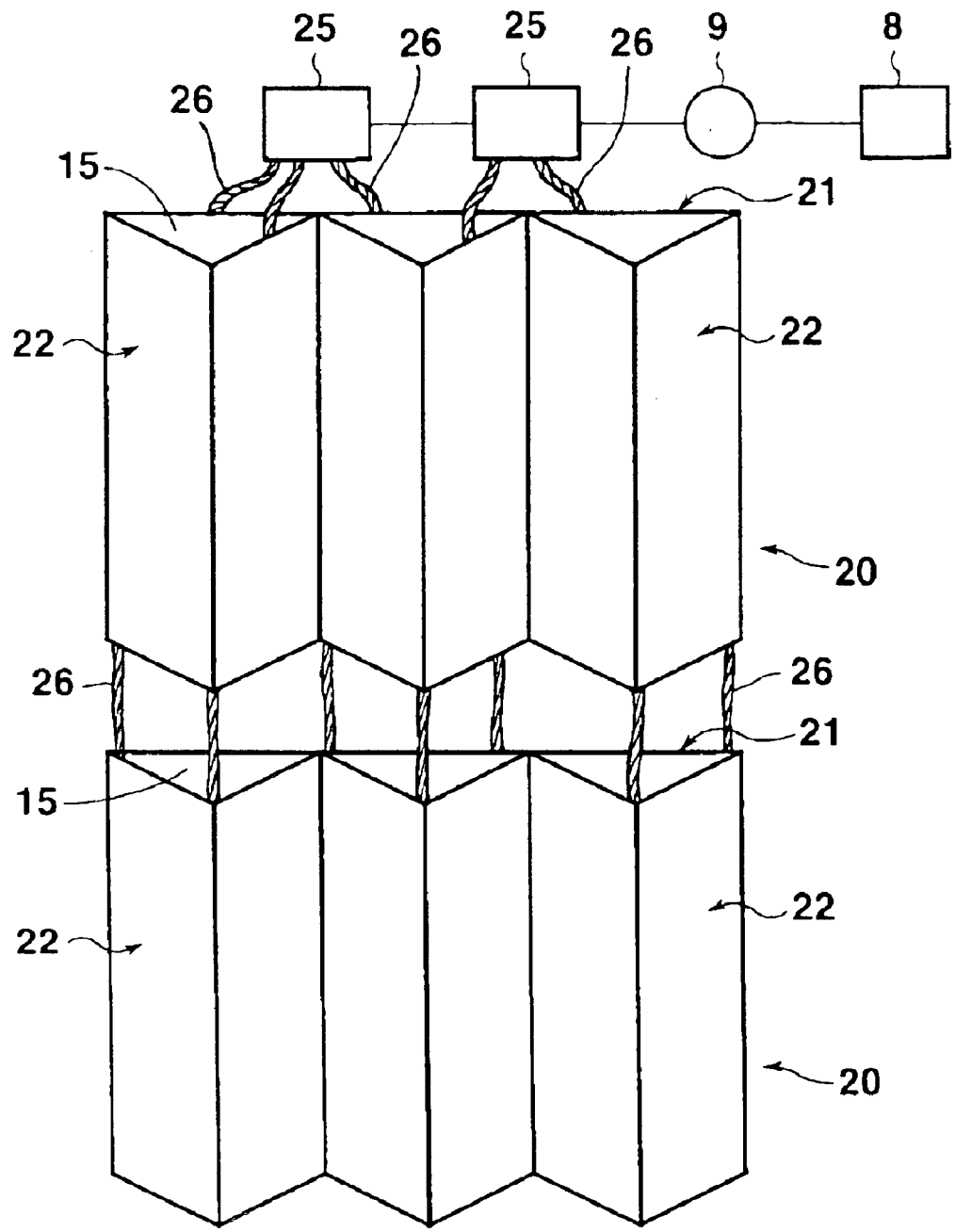
FIG. 9 is an elevation showing an essential portion of activated carbon fiber boards equipped with a capillary member according to another embodiment.

With reference to FIG. 9, a capillary member according to another embodiment of the present invention will be described. FIG. 9 is an elevation showing an essential portion of an activated carbon fiber board equipped with a capillary member according to another embodiment. Herein, the same structural members as employed in FIG. 3 are denoted by the same reference numerals, and repeated descriptions thereof are omitted.

FIG. 9 shows a catalyst unit according to another embodiment in which two stages of modules of the activated carbon fiber board 20 are stacked. A catalyst unit 6 is formed of the upper and lower activated carbon fiber boards 20, which are linked by cords 26 serving as constitutional elements of the capillary member which water permeates. Water reserved in each water reservoir 25 is supplied directly to the upper activated carbon fiber boards 20 by permeating the cords 26. Water droplets which have been passed through the upper activated carbon fiber boards 20 are supplied directly to, by permeating the cords 26, a plate-like activated carbon fiber sheet 21 and a corrugated activated carbon fiber sheet 22 which constitute the lower activated carbon fiber boards 20. Thus, in the lower activated carbon fiber boards 20, water permeates the entirety of carbon fiber sheets facing the conduits 15 so as to attain uniform water distribution.

In this case, even when two stages of activated carbon fiber boards 20 are provided, water can be supplied, by the mediation of the cords 26, to the plate-like activated carbon fiber sheets 21 and the corrugated activated carbon fiber sheets 22 provided in the upper and lower activated carbon fiber boards 20, without being affected by characteristics of the discharge gas such as flow rate. Thus, water can be supplied to the entirety of the upper and lower activated carbon fiber boards 20 so as to attain uniform water distribution, and the catalyst unit 6 formed of the activated carbon fiber boards 20 can be provided.

The upper and lower activated carbon fiber boards 20 may be linked by the fabric member 29 shown in FIG. 8. Water can be supplied to the upper activated carbon fiber board 20 by the mediation of the fabric member 29. Alternatively, water may be supplied directly, by spray means such as a sprinkler or a pipe-form shower, to the upper section of a plate-like activated carbon fiber sheet 21 and that of a corrugated activated carbon fiber sheet 22.

Accordingly, the aforementioned flue gas desulfurization apparatus can be provided with a catalyst unit 6 containing an activated carbon fiber board 20 allowing uniform water distribution. In addition, the aforementioned desulfurization method attains removal of sulfur oxides ($SO_x$) by means of an activated carbon fiber board 20 allowing a uniform water distribution.

Figure 10:
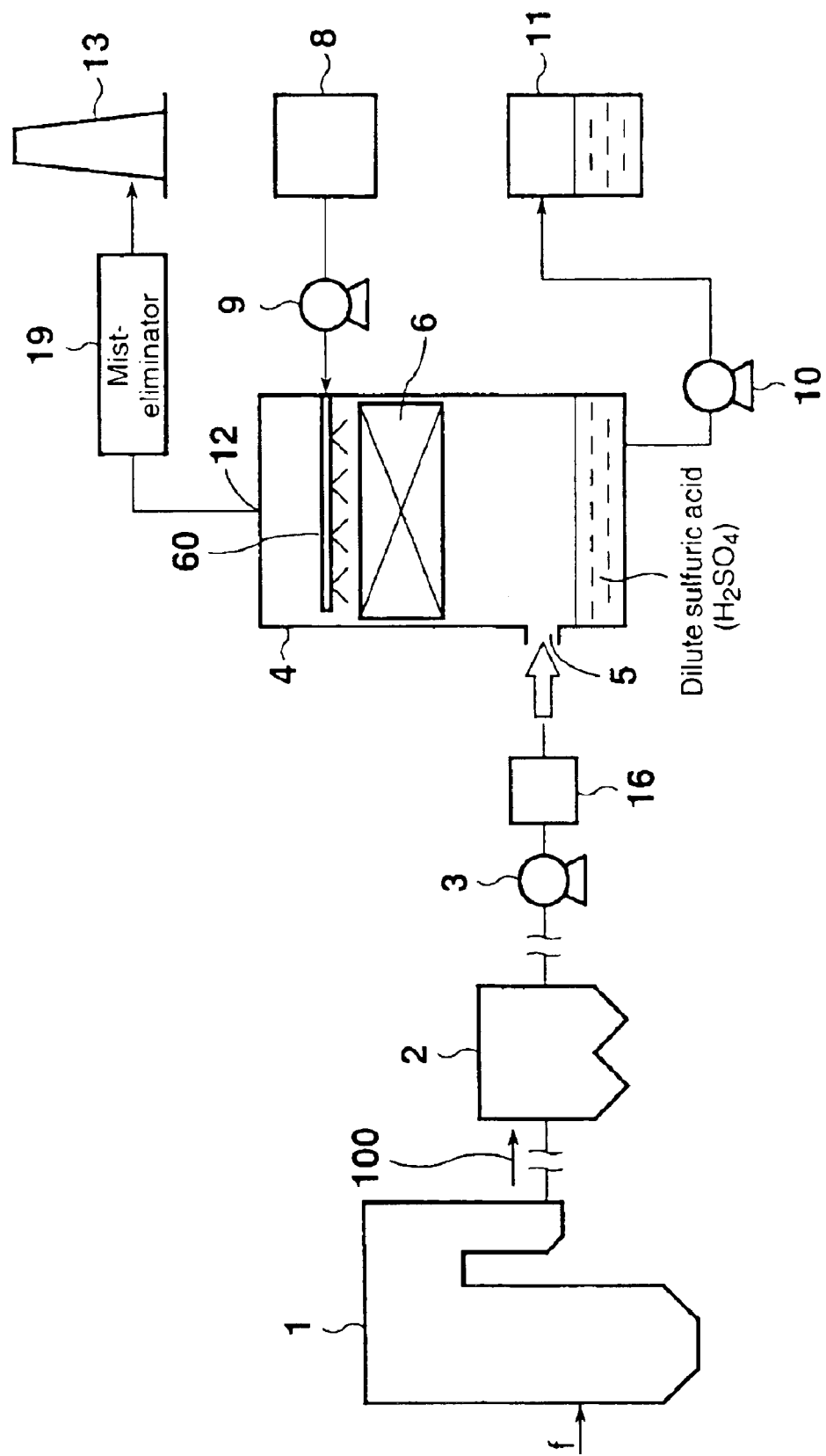
FIG. 10 is a schematic diagram of a discharge gas process system (production of sulfuric acid) employing the flue gas desulfurization apparatus according to a second embodiment.

With reference to FIG. 10, a discharge gas process system according to a second embodiment of the present invention will be described. Herein, the same structural members as employed in the discharge gas process system shown in FIG. 1 are denoted by the same reference numerals. In the discharge gas process system shown in FIG. 10, the capillary member 7 contained in the discharge gas process system shown in FIG. 1 is replaced by a water-supplying nozzle 60.

According to the discharge gas process system shown in FIG. 10, sulfur oxides contained in a discharge gas are, removed by means of a desulfurization apparatus to thereby form sulfuric acid. As shown in FIG. 10, the desulfurization apparatus includes a boiler 1 for driving a steam turbine so as to generate steam, a soot collector 2 for removing soot contained in a discharge gas 100 generated by the boiler 1, a feed fan 3 for feeding the soot-removed discharge gas into a desulfurization tower 4, a humidifying-cooling apparatus 16 for cooling and humidifying the discharge gas 100 before feeding to the desulfurization tower 4 (or in the tower), the desulfurization tower 4, including a catalyst unit 6, for introducing the discharge gas 100 from an inlet 5 provided in a lower section of the sidewall of the tower and for feeding water through a water-supplying nozzle 60 provided above the catalyst unit 6, to thereby effect desulfurization in which $SO_x$ contained in the discharge gas is converted to dilute sulfuric acid ($H_2SO_4$), a chimney 13 for discharging, to the outside, a purified (desulfurized) discharge gas released from an outlet 12 of the top of the tower, and a sulfuric acid tank 11 for storing dilute sulfuric acid fed from the desulfurization tower 4 by means of a discharge pump 10. An optional mist-eliminator 19 may be inserted in the line for discharging a purified (desulfurized) discharge gas generated from the desulfurization tower, to thereby separate water contained in the discharge gas.

Herein, the boiler 1, for example, a boiler for generating steam for driving a steam turbine (not illustrated) of a thermal power plant, combusts fuel f (e.g., coal or heavy oil) in its furnace. A discharge gas generated from the boiler 1 contains sulfur oxides ($SO_x$). The discharge gas undergoes a $NO_x$ removal process by means of an $NO_x$ removal unit (not illustrated), is cooled by means of an air pre-heater, and subsequently undergoes a soot removal process by means of a soot collector 2.

The thus-soot-removed discharge gas 100 is fed from the inlet 5 provided in a lower section of the sidewall of the desulfurization tower 4 to the desulfurization tower 4 by means of a feed fan 3. The desulfurization tower 4 includes the catalyst unit 6 formed of an activated carbon fiber board, and water for producing sulfuric acid is supplied from a water-supplying nozzle 60 to the catalyst unit 6. When the discharge gas is fed from the bottom of the catalyst unit and caused to pass through the catalyst unit 6 to which water is supplied from the above nozzle, $SO_x$ contained in the discharge gas 100 can be removed through chemical reaction. The discharge gas which has passed through the catalyst unit 6 is discharged from an outlet 12, and is released to air through a chimney 13.

The aforementioned catalyst unit 6 contains a catalyst comprising a plurality of activated carbon fiber boards. On a surface of each activated carbon fiber board, desulfurization reaction occurs (see reaction mechanism shown in the description in relation to FIG. 1).

The thus-released sulfuric acid ($H_2SO_4$) is dilute sulfuric acid and discharged into a sulfuric acid tank 11 via a discharge pump 10. As described above, desulfurization of the discharge gas is performed by causing sulfur dioxide ($SO_2$) contained in the discharge gas 100 to be adsorbed by the activated carbon fiber boards contained in the catalyst unit 6 for oxidation, reacting the oxidation product with water ($H_2O$), to thereby form sulfuric acid ($H_2SO_4$), and releasing the sulfuric acid from the catalyst unit.

Figure 11:
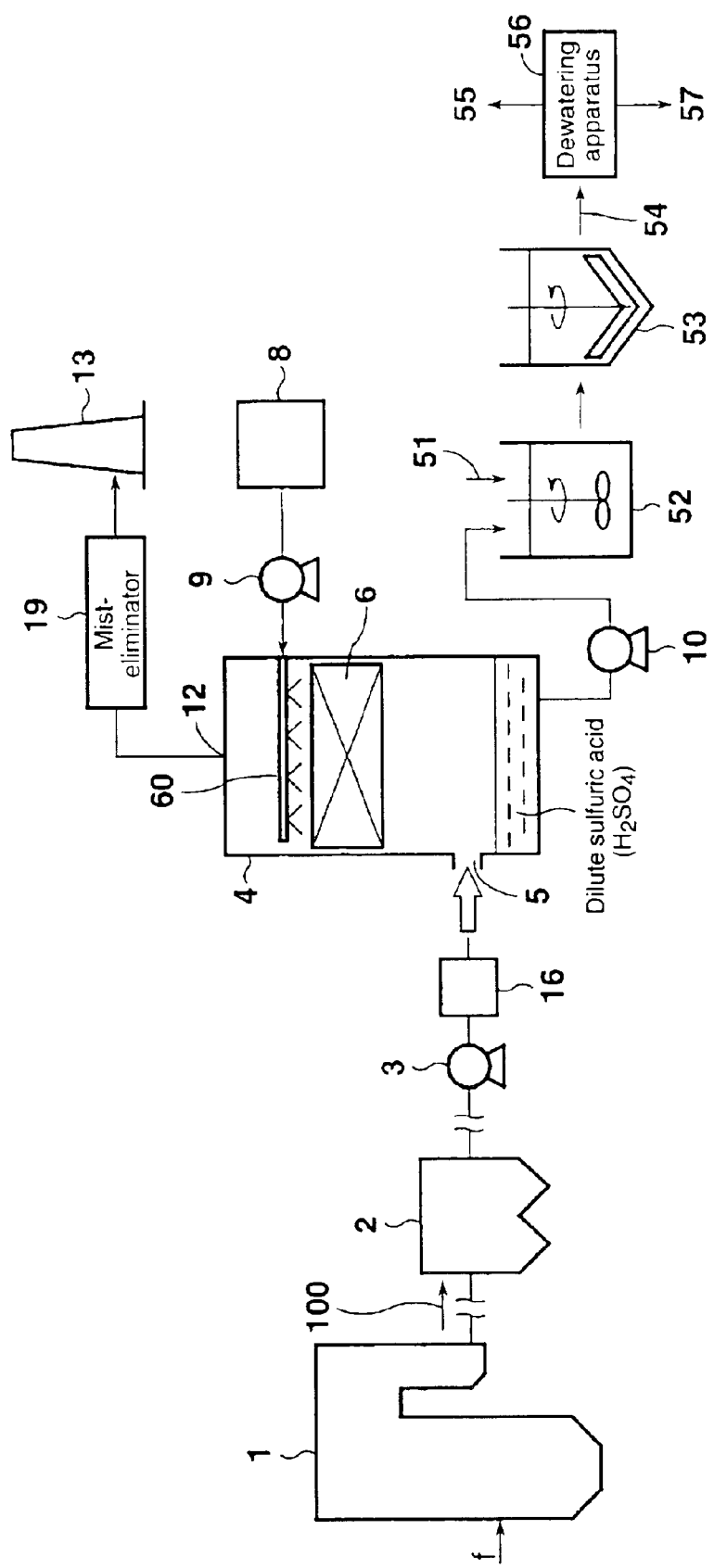
FIG. 11 is a schematic diagram of a discharge gas process system (production of gypsum) according to another embodiment.

With reference to FIG. 11, a discharge gas process system according to another embodiment of the present invention will be described. Herein, the same structural members as employed in the discharge gas process system shown in FIG. 2 are denoted by the same reference numerals. In the discharge gas process system shown in FIG. 11, the capillary member 7 contained in the discharge gas process system shown in FIG. 2 is replaced by a water-supplying nozzle 60. According to the discharge gas process system shown in FIG. 11, sulfur oxides contained in a discharge gas are removed by means of a desulfurization apparatus, to thereby form sulfuric acid, and lime slurry is fed to the resultant sulfuric acid, to thereby produce gypsum.

As shown in FIG. 11, the desulfurization apparatus includes a boiler 1 for driving a steam turbine so as to generate steam, a soot collector 2 for removing soot contained in a discharge gas 100 generated by the boiler 1, a feed fan 3 for feeding the soot-removed discharge gas into a desulfurization tower 4, a humidifying-cooling apparatus 16 for cooling and humidifying the discharge gas 100 in the desulfurization tower or before feeding to the desulfurization tower, the desulfurization tower 4, including a catalyst unit, for introducing the discharge gas 100 from an inlet 5 provided in a lower section of the sidewall of the tower and for feeding water through a water-supplying nozzle 60 provided above the catalyst unit 6, to thereby effect desulfurization in which $SO_x$ contained in the discharge gas is converted to dilute sulfuric acid ($H_2SO_4$), a chimney 13 for discharging, to the outside, a purified (desulfurized) discharge gas released from an outlet 12 of the top of the tower, a gypsum reaction tank 52 for storing dilute sulfuric acid ($H_2SO_4$) fed from the desulfurization tower 4 via a discharge pump 10 and for depositing gypsum by reaction with supplied lime slurry 51, a settling tank (thickener) 53 for settling gypsum and a dewatering apparatus 56 for removing water as waste water (filtrated liquid) 57 from gypsum slurry 54, to thereby yield gypsum 55.

In the discharge gas process system shown in FIG. 10, sulfuric acid obtained through desulfurization is used as a sulfuric acid product. However, in the discharge gas process system shown in FIG. 11, lime slurry is fed to the produced sulfuric acid, thereby forming gypsum slurry, followed by dehydration, to thereby yield a gypsum product.

The same flue gas desulfurization apparatus according to the second embodiment is employed in the systems shown in FIGS. 10 and 11. Thus, the structure of the flue gas desulfurization apparatus will be described with reference to FIG. 12.

Figure 12:
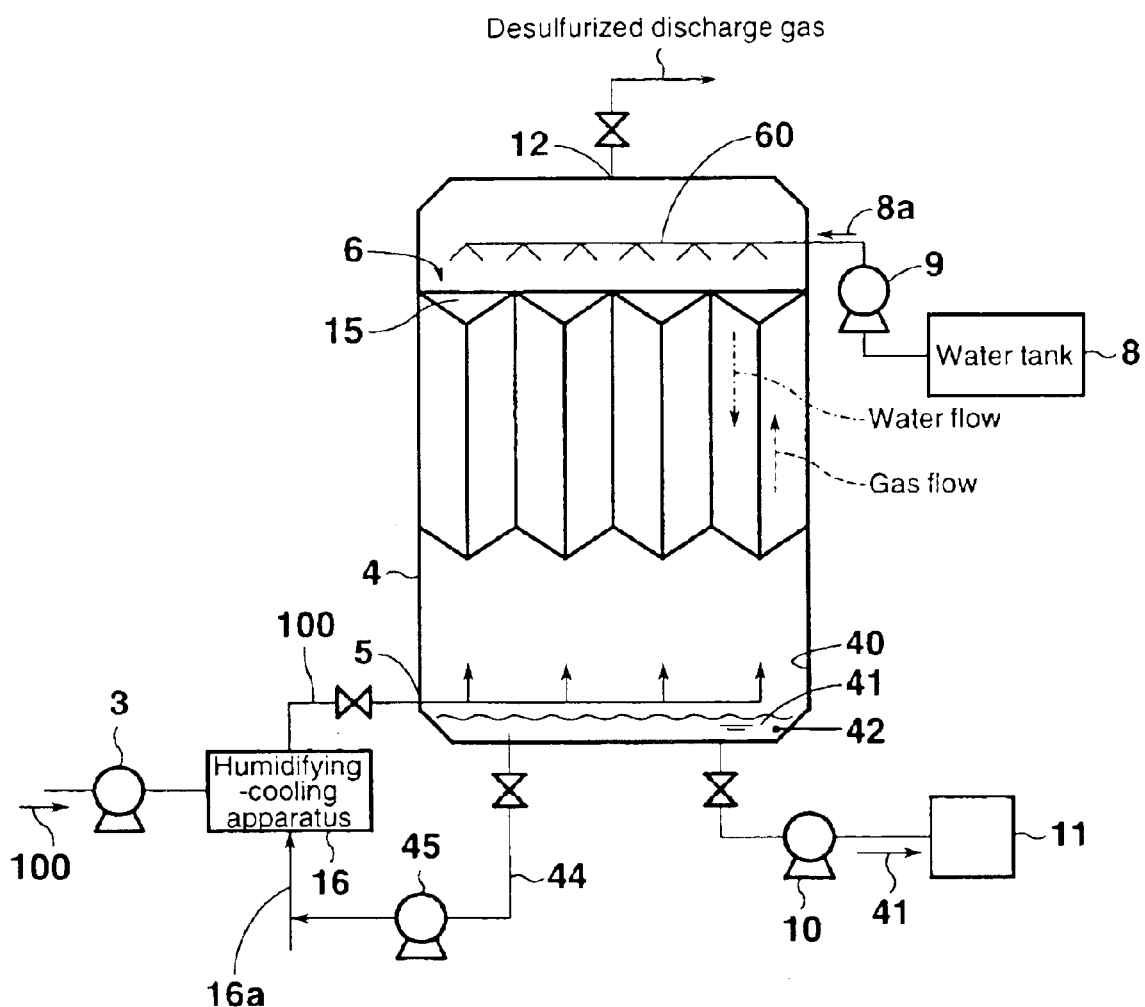
FIG. 12 is a structural diagram of a flue gas desulfurization apparatus according to a second embodiment.

As shown in FIG. 12, the flue gas desulfurization apparatus includes an inlet 5 for introducing a discharge gas 100 containing sulfur oxides in the sidewall (or lower section) of the apparatus in the form of a tower, in an upper portion, an outlet 12 for discharging the discharge gas 100, and a water-supplying nozzle 60 disposed above a catalyst unit 6 which is provided in the desulfurization tower 4 and which supplies water for producing sulfuric acid to the catalyst unit formed of an activated carbon fiber board.

In a lower section of the desulfurization tower 4 is provided a sulfuric acid reservoir 40, where dilute sulfuric acid 41 collected by the catalyst unit 6 is stored.

Figure 13:
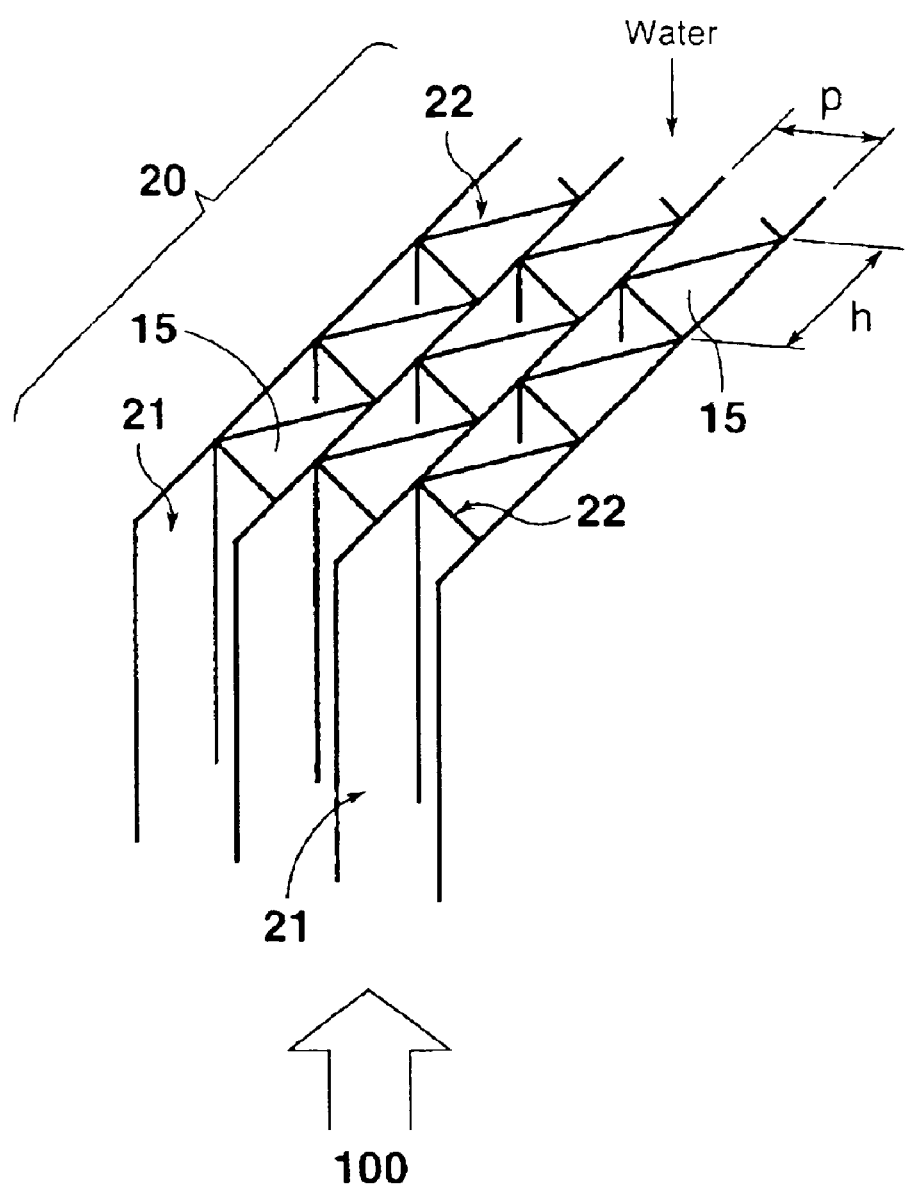
FIG. 13 is a perspective view of an activated carbon fiber board.

FIG. 13 shows the structure of the catalyst unit 6. FIG. 13 is a perspective view showing the catalyst unit, which corresponds to that shown in the aforementioned FIG. 4.

As shown in FIG. 13, the activated carbon fiber board 20 which forms a unit catalyst in the catalyst unit 6 is formed by alternatingly juxtaposing one or more plate-like activated carbon fiber sheets 21 and one or more corrugated activated carbon fiber sheets 22. Spaces extending straightly and provided between two sheets serve as conduits 15, with the conduits 15 extending vertically. The plate-like activated carbon fiber sheets 21 and the corrugated activated carbon fiber sheets 22 are formed into sheets. The corrugated activated carbon fiber sheet 22 is formed by use of a corrugator or similar means. Alternatively, these activated carbon fiber sheets may be formed into a honeycomb shape so as to enable passage of the discharge gas in parallel to the sheets.

From the water-supplying nozzle 60, water is sprayed thereto, and the discharge gas 100 is introduced from a position below the activated carbon fiber boards 20. Water which has passed through the activated carbon fiber boards 20 falls, in the form of droplets of about some mm in size, to the bottom of the tower. The discharge gas 100 passes through conduits 15 provided by alternatingly juxtaposing the plate-like activated carbon fiber sheets 21 and corrugated activated carbon fiber sheets 22. Thus, increase of pressure loss can be suppressed.

The thus-released sulfuric acid ($H_2SO_4$) is dilute sulfuric acid 41 and discharged into a sulfuric acid tank 11 via a discharge pump 10. As described above, desulfurization of the discharge gas is performed by causing sulfur dioxide ($SO_2$) contained in the discharge gas 100 to be adsorbed by the activated carbon fiber boards contained in the catalyst unit 6 for oxidation, reacting the oxidation product with water ($H_2O$), to thereby form sulfuric acid ($H_2SO_4$), and releasing the sulfuric acid from the catalyst unit.

The aforementioned sulfuric acid reservoir 40 includes a sulfuric acid concentration meter 42, which measures the sulfuric acid concentration inside the reservoir.

When the aforementioned plants are stopped, water for humidifying-cooling 16a and additional water 8a are fed to the desulfurization apparatus, since hot airflow is continuously fed to the apparatus. In this case, since a discharge gas 100 containing sulfur oxides is not fed to the desulfurization apparatus, concentration of the formed sulfuric acid gradually lowers.

When the sulfuric acid concentration is decreased below a certain level (0.5% or less), as measured by means of the sulfuric acid concentration meter 42, gypsum is formed, but a product of the formed gypsum cannot be obtained. Thus, discharge of such dilute sulfuric acid to the outside is stopped, and dilute sulfuric acid is stored in the sulfuric acid reservoir 40.

Subsequently, upon starting the plants, the stored low-concentration sulfuric acid is fed to the humidifying-cooling apparatus 16 through a liquid-feed line 44 by means of a liquid-feed pump 45 inserted in the line, and is employed as a liquid to be sprayed for humidifying and cooling.

When the low-concentration sulfuric acid is employed as a liquid to be sprayed for humidifying and cooling, the amount of $SO_x$ originating from sulfuric acid increases. However, the increase in $SO_x$ concentration is small as compared with the $SO_x$ concentration in a discharge gas at restarting of the desulfurization apparatus. Thus, use of the low-concentration sulfuric acid prevents increase in process load of the desulfurization tower 4.

In this case, since the low-concentration sulfuric acid produced during a halt of the plants is fed back to the humidifying-cooling apparatus 16 and is used in desulfurization again, the sulfuric acid concentration in the sulfuric acid reservoir 40 gradually increases. When the concentration is elevated to a level higher than a predetermined concentration, enabling the production of gypsum, the destination of discharged dilute sulfuric acid is switched from the humidifying-cooling apparatus 16 to a sulfuric acid tank 11.

The procedure will be described with reference to FIG. 14.

Figure 14:
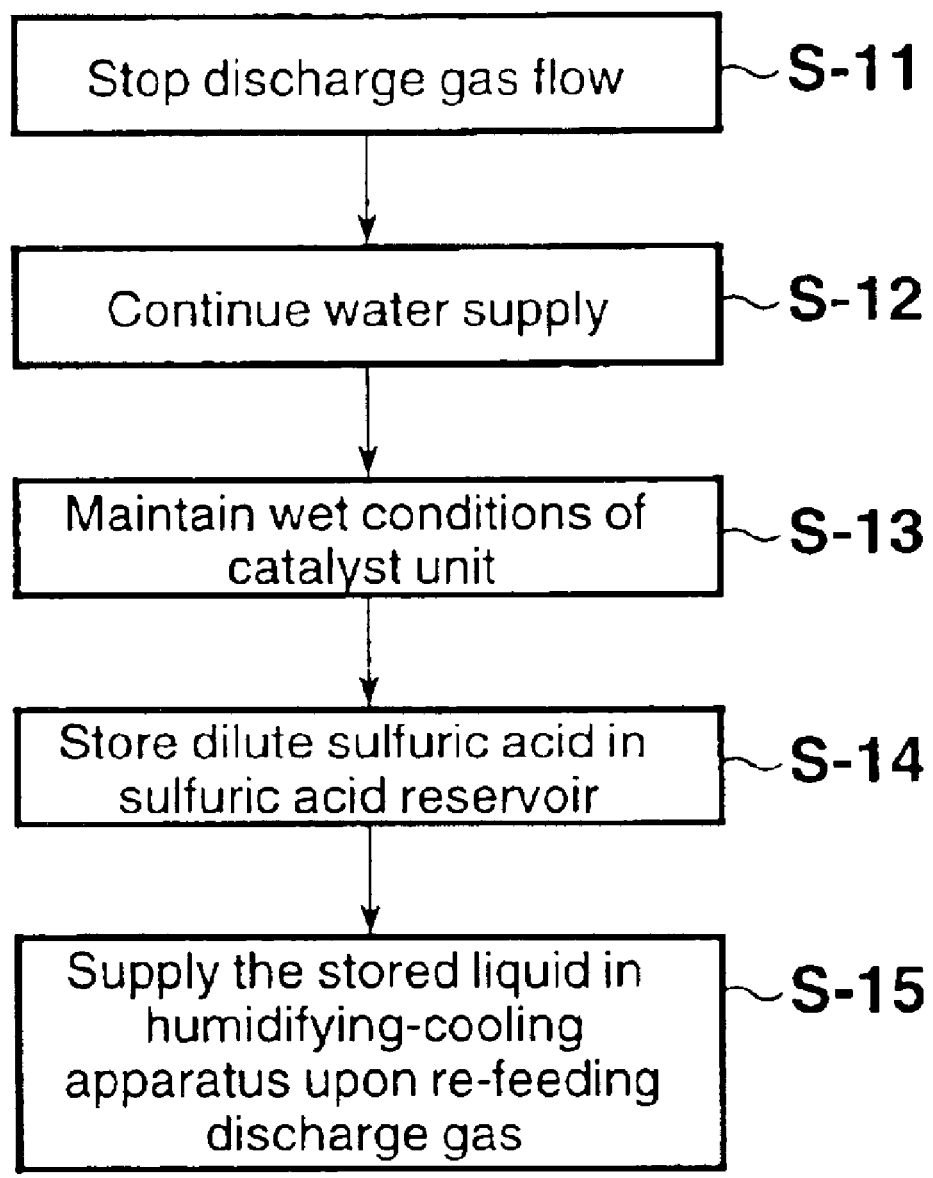
FIG. 14 is a flow chart showing a procedure of stopping supply of discharge gas.

As shown in FIG. 14, passage of the discharge gas 100 is stopped when the plants are stopped (S-11).

In this case, supplying of water from the water-supplying nozzle 60 is continued (S-12).

Through continuous supplying of water, wet conditions of activated carbon fiber placed in the catalyst unit 6 are maintained (S-13).

The catalyst is washed by water supplied from the water-supplying nozzle 60, and the liquid obtained through washing is dilute sulfuric acid. The dilute sulfuric acid is stored in the sulfuric acid reservoir 40 (S-14).

Upon restarting of the plants, the low-concentration dilute sulfuric acid is fed to the humidifying-cooling apparatus 16 and employed as a liquid 16*a* for humidifying and cooling the discharge gas (S-15).

As described above, the low-concentration sulfuric acid which is produced during a halt and starting of the desulfurization apparatus is effectively utilized, to thereby enhance desulfurization efficiency. In addition, sulfuric acid present on a surface of activated carbon fiber contained in the catalyst unit is washed, to thereby eliminate poisoning of the catalyst by sulfuric acid, leading to prevention of decrease in catalytic activity.

The present invention has been described by way of the above embodiment in which low-concentration sulfuric acid is employed as a liquid for humidifying and cooling. However, the embodiment should not be construed as limiting the invention thereto. The low-concentration sulfuric acid may be used as a liquid 8*a* to be supplied by the water-supplying nozzle 60 provided above the catalyst unit 6.

FIG. 15 is a general structural diagram of a flue gas desulfurization apparatus according to a third embodiment.

With reference to FIG. 15, the desulfurization apparatus of the embodiment includes the desulfurization apparatus shown in FIG. 12, wherein a sulfuric acid concentration meter 42 inserted in a sulfuric acid discharge line 46, a shift valve 47 for switching lines in accordance with the sulfuric acid concentration as measured by means of the sulfuric acid concentration meter 42, a low-concentration sulfuric acid tank 48 temporarily storing sulfuric acid for humidifying-cooling fed by switching the valve 47, and a sulfuric acid tank 11 are provided.

According to the desulfurization apparatus, when the sulfuric acid concentration decreases to a low level (1% or less, or 0.5% or less) due to presence of small amounts of sulfur oxides during desulfurization and is regarded as a level which cannot produce gypsum, feeding of sulfuric acid to the sulfuric acid tank 11 is stopped. Then, feeding of sulfuric acid is switched to the low-concentration sulfuric acid tank 48 for humidifying-cooling to thereby prevent a decrease in sulfuric acid concentration in the sulfuric acid tank 11.

As described above, low-concentration sulfuric acid produced during a halt of the desulfurization apparatus is employed as a liquid for humidifying and cooling upon restarting of the apparatus. Thus, dilute sulfuric acid is not required to undergo industrial waste treatment.

Figure 16:
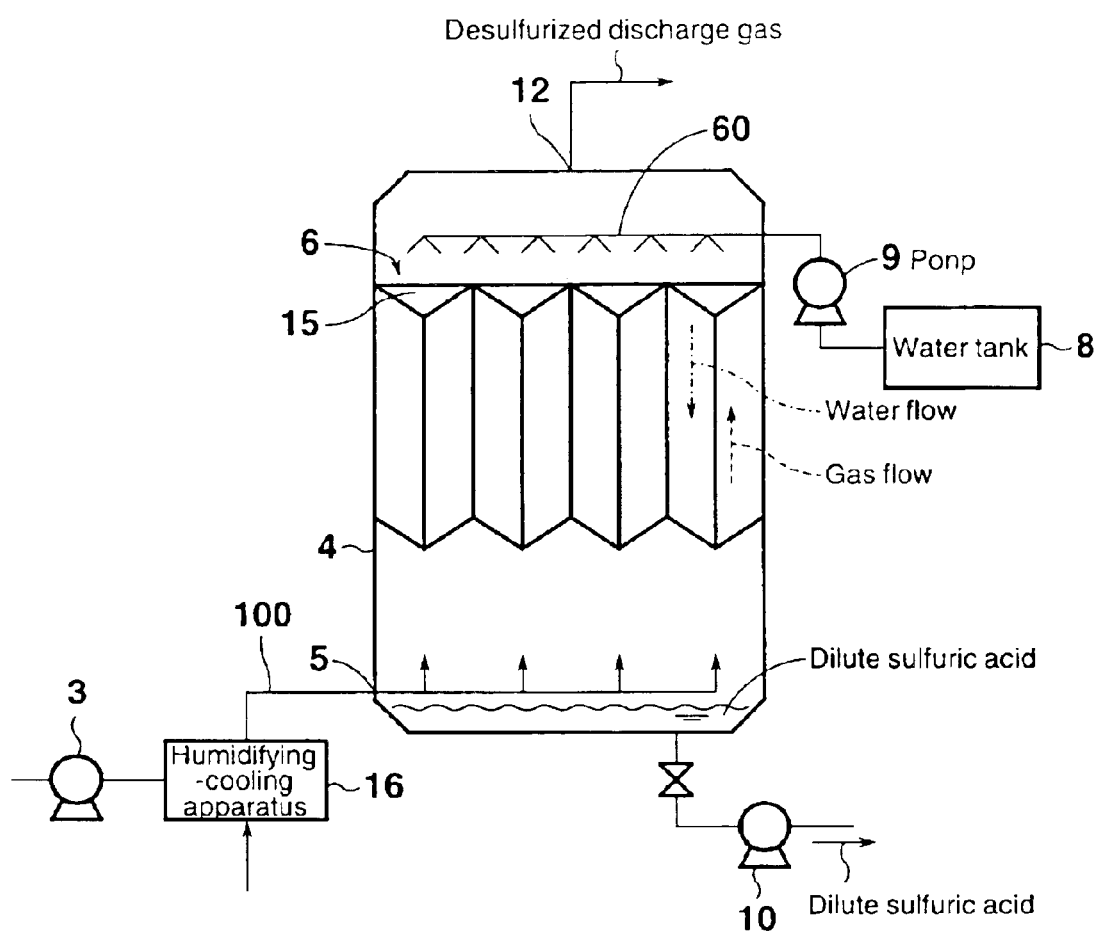
FIG. 16 is a structural diagram of a flue gas desulfurization apparatus according to a fourth embodiment.

With reference to FIG. 16, the flue gas desulfurization apparatus according to a fourth embodiment will be described. The discharge gas process system including the flue gas desulfurization apparatus according to a fourth embodiment is identical to those shown in FIGS. 10 or 11. Thus, the flue gas desulfurization apparatus shown in FIG. 16 employs the catalyst unit 6 employed in the discharge gas process system as shown in FIGS. 10 or 11. Herein, the same members as employed in the flue gas desulfurization apparatus shown in FIG. 12 are denoted by the same reference numerals. The activated carbon fiber boards employed in the catalyst unit 6 are described with reference to FIG. 13.

As shown in FIG. 16, the desulfurization apparatus includes an inlet 5 for introducing a discharge gas 100 containing sulfur oxides in the sidewall (or lower section) of the apparatus in the form of a tower, an outlet 12 for discharging the discharge gas 100, and a water-supplying nozzle 60 disposed above a catalyst unit 6 which is provided in the desulfurization tower 4 and which supplies water for producing sulfuric acid to the catalyst unit formed of an activated carbon fiber board.

As shown in FIG. 13, the activated carbon fiber board 20, which forms a unit catalyst in the catalyst unit 6, is formed by alternatingly juxtaposing one or more plate-like activated carbon fiber sheets 21 and one or more corrugated activated carbon fiber sheets 22. Spaces extending straightly and provided between two sheets serve as conduits 15, with the conduits 15 extending vertically. The plate-like activated carbon fiber sheets 21 and the corrugated activated carbon fiber sheets 22 are formed into sheets. The corrugated activated carbon fiber sheet 22 is formed by use of a corrugator or similar means.

Alternatively, these activated carbon fiber sheets may be formed into a honeycomb shape so as to enable passage of the discharge gas in parallel to the sheets.

From the water-supplying nozzle 60, water is sprayed thereto, and the discharge gas 100 is introduced from a position below the activated carbon fiber boards 20. Water which has passed through the activated carbon fiber boards 20 falls, in the form of droplets of about some mm in size, to the bottom of the tower. The discharge gas 100 passes through comparatively narrow conduits 15 provided by alternatingly juxtaposing the plate-like carbon fiber sheets 21 and corrugated carbon fiber sheets 22. Thus, an increase of pressure loss can be suppressed.

The procedure of providing the catalyst unit 6 in the above desulfurization tower 4 will next be described with reference to FIGS. 17 and 18.

Figure 17:
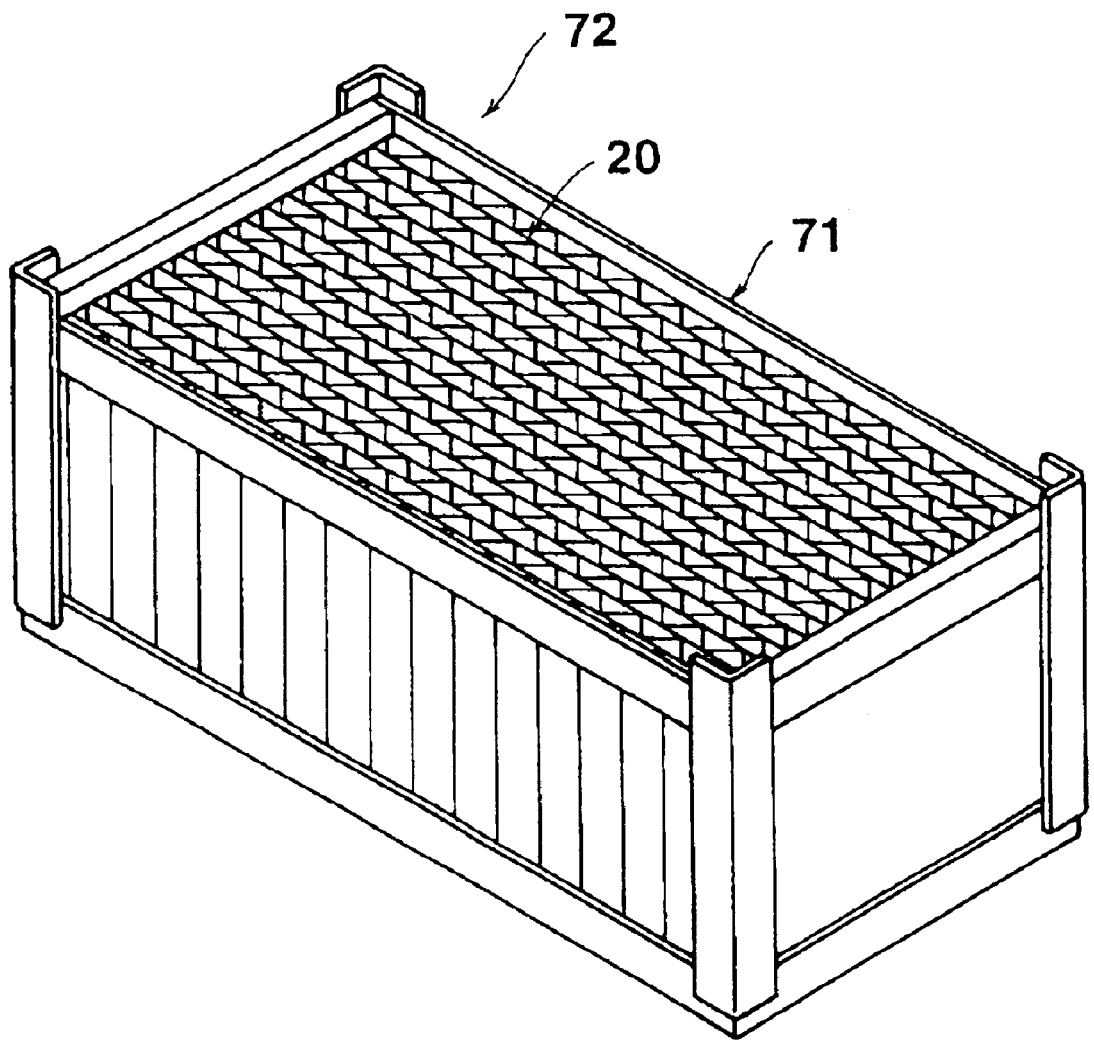
FIG. 17 is a perspective view of a catalyst unit.

As shown in FIG. 17, a frame body 71 is filled with juxtaposed activated carbon fiber boards 20, to thereby provide a catalyst unit 72 (e.g., height: 0.5 m to 4 m).

Then, the catalyst unit 72 is immersed in a wetting bath (not illustrated) separately provided outside the desulfurization apparatus, to thereby wet the catalyst unit. In this case, wetting conditions are preferably controlled such that the amount of water is twice or more the self weight of the catalyst (i.e., the catalyst's own weight). For example, when the net weight of the catalyst containing a plurality of activated carbon fiber boards 20 is 40 to 50 kg, the catalyst is preferably impregnated with water in an amount of at least 80 to at least 100 kg.

After the catalyst has been wetted, the catalyst unit 72 is placed in the desulfurization tower 4 by use of lifting means such as a crane or similar means.

Specifically, when a large amount of discharge gas is processed by a desulfurization apparatus of a capacity of 1,000 m$^3$ (height: 10 m, area 100 m$^2$), 2,000 units of catalyst units (1 m×1 m×0.4 m) are required. Thus, a large amount of water is needed to wet the catalyst. If the water is supplied in a non-stop sprinkling manner, an enormously large amount of water must be used, which is not preferred from the economic viewpoint. In a manner employed in the embodiment of the present invention, catalyst units are individually wetted, followed by placement in the desulfurization tower. Thus, the desulfurization apparatus can be started immediately, leading to enhancement of efficiency.

Figure 18:
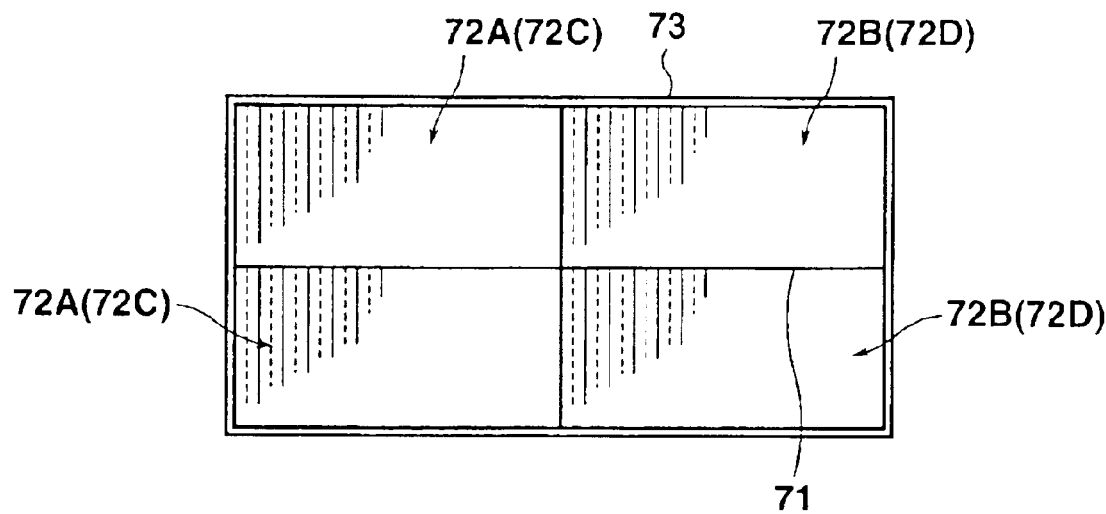
FIG. 18 shows an elevation and a plan view of catalyst units.
Figure 18:
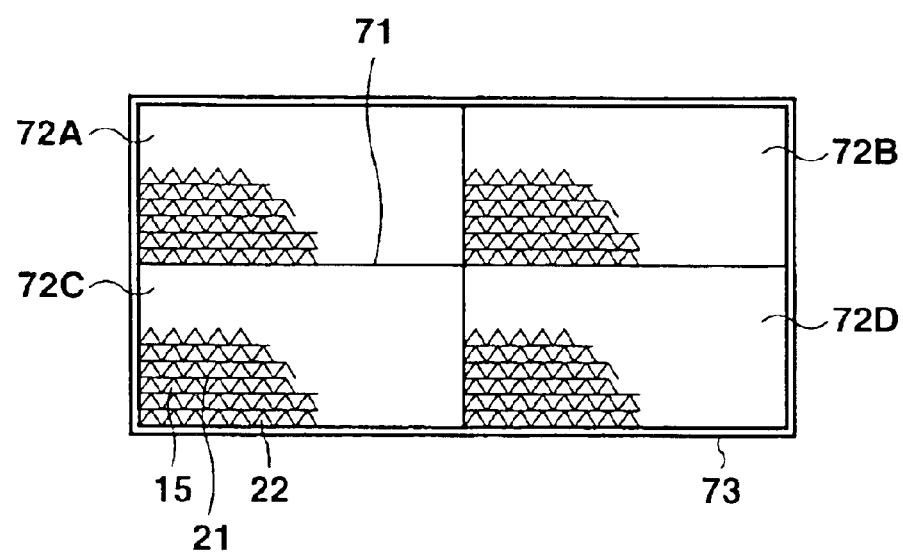

FIG. 18 shows an assembled catalyst unit in which one module includes four catalyst units 72, two modules are stacked, and the stacked units are placed in a casing 73. FIGS. 18(A) and 18(B) show an elevation and a plan view of catalyst units, respectively.

In this case, catalyst units 72A to 72D are individually wetted, and successively placed by use of a crane into a casing 73 which has been provided in advance in the apparatus in the form of tower.

The catalyst module may be stacked a plurality of times (e.g., 3 to 5).

Alternatively, when additional wetted catalyst units are placed in the desulfurization tower, the entirety of the catalyst units are wetted and frozen. The thus-frozen catalyst units are placed in the tower by use of a crane.

The above method of placement of the units in a frozen state is an effective method when the wetting bath cannot be placed in the vicinity of the desulfurization tower 4. In other words, when the catalyst units must be transported over a long distance to the desulfurization tower 4, water contained in the catalyst units 72, which have been wetted in advance, is lost during transportation. Thus, in order to start a flue gas desulfurization apparatus employing such catalyst units, additional supplying of water for wetting must be performed after placement of the catalyst units in the desulfurization tower 4. In contrast, even when the frozen catalyst units are vibrated during transportation, water is not lost. Thus, the desulfurization apparatus can be started immediately after placement of the catalyst units in the desulfurization tower 4, leading to enhancement of efficiency.

The amount of water (water/humidified discharge gas) contained in the above discharge gas coming into contact with the catalyst units in the desulfurization tower 4 of the flue gas desulfurization apparatus of the present invention is saturated vapor amount plus 0.5 to 10, preferably saturated vapor amount plus 1.0 to 1.5 vol. %. The saturated vapor amount is, for example, 12.2 vol. % (50° C.).

The saturated vapor amount is 7.3 vol. % at 40° C. or 19.7 vol. % at 60° C. When the amount of water is below the above saturated vapor amount, the aforementioned release of sulfuric acid during desulfurization cannot effectively be attained.

Accordingly, wetting the catalyst units before starting of the apparatus facilitates operation of the apparatus at a water content equal to or higher than the saturated vapor amount. In other words, if desulfurization is started without wetting before starting the apparatus, activated carbon fiber fails to attain uniform water distribution (presence of wetted portions and non-wetted portions), failing to perform effective desulfurization.

The cooling temperature during humidifying-cooling is appropriately determined on the basis of the relationship between temperature and water content of the discharge gas. During desulfurization, the cooling temperature is preferably, for example, 40 to 60° C. for the following reason. When the cooling temperature is higher than 60° C., the amount of vaporized water increases, thereby increasing the amount of water to be supplied, resulting in an increase in process cost. A cooling temperature lower than 40° C. cannot substantially be attained when a discharge gas is cooled through a typical humidifying-cooling method.

When the discharge gas 100 having a saturated vapor amount which has been attained by humidifying-cooling by means of the humidifying-cooling apparatus 16 is fed into the desulfurization tower 4 and comes into contact with the catalyst units contained in the catalyst units 6, release of SO$_3$ formed on the catalyst surface through oxidation of SO$_2$ smoothly proceeds by controlling the water content of the discharge gas to be saturated vapor amount plus 0.5 to 10 (preferably, saturated vapor amount plus 1.0 to 1.5 vol. %). Thus, sulfuric acid does not remain on the surface of activated carbon fiber, and active sites are effectively utilized, thereby increasing desulfurization efficiency.

As described above, sufficiently wet conditions of the catalyst units are essentially attained upon starting of the flue gas desulfurization apparatus. Thus, after the catalyst units have been wetted through a variety of methods, the apparatus is started, thereby efficiently performing desulfurization.

Next, the case in which the catalyst is wetted by placing a wetting tank in the desulfurization tower will be described.

Figure 19:
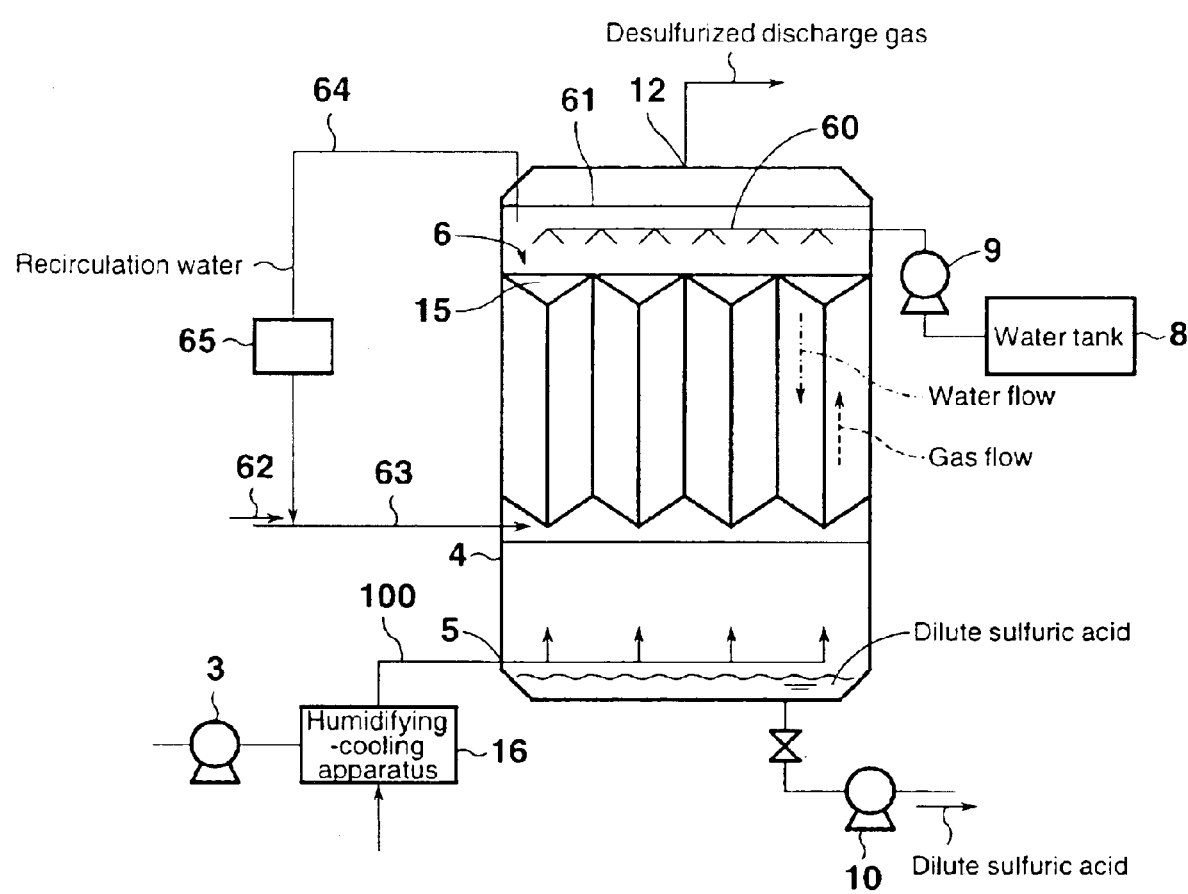
FIG. 19 is a structural diagram of a flue gas desulfurization apparatus according to a fifth embodiment.

FIG. 19 is a system configuration of a flue gas desulfurization apparatus according to a fifth embodiment.

As shown in FIG. 19, the flue gas desulfurization apparatus includes an inlet 5 for introducing a discharge gas 100 containing sulfur oxides in the sidewall (or lower section) of the apparatus in the form of a tower, an outlet 12 for discharging the discharge gas 100, and a water-supplying nozzle 60 disposed above a catalyst unit 6 which is provided in the desulfurization tower 4 and which supplies water for producing sulfuric acid to the catalyst unit formed of an activated carbon fiber board. The catalyst unit 6 is disposed inside a catalyst wetting tank 61, and the catalyst wetting tank 61 is equipped with a wetting water supply line 63 for supplying wetting water 62 and a circulation line 64 for circulating wetting water 62 serving as circulation water.

Each of the upper and lower faces of the catalyst wetting tank 61, a discharge-gas-inlet hole and a discharge-gas-outlet hole (not illustrated) are provided such that these holes can be arbitrarily opened and shut. Upon desulfurization, the aforementioned holes remain open.

According to the apparatus, the catalyst unit 6 is placed in the catalyst wetting tank 61 before starting the flue gas desulfurization apparatus. Subsequently, wetting water 62 is supplied from the wetting water supply line 63, to thereby wet the catalyst. Wetting conditions may be judged by means of detection means (not illustrated) such as a sensor.

A filter layer 65 may be inserted in the circulation line 64 for circulating wetting water 62 so as to prevent migration of undesired objects during circulation.

As described above, activated carbon fiber contained in the catalyst unit can be fully wetted during starting of the flue gas desulfurization apparatus by placing the catalyst unit 6 in the catalyst wetting tank 61. Thus, effective catalytic activity at an initial stage can be attained, and deterioration of the catalyst can be prevented during subsequent operation.

Next, the case in which the catalyst is wetted in the desulfurization apparatus by monolithically placing a plurality of wetting tanks inside the desulfurization tower will be described.

Figure 20:
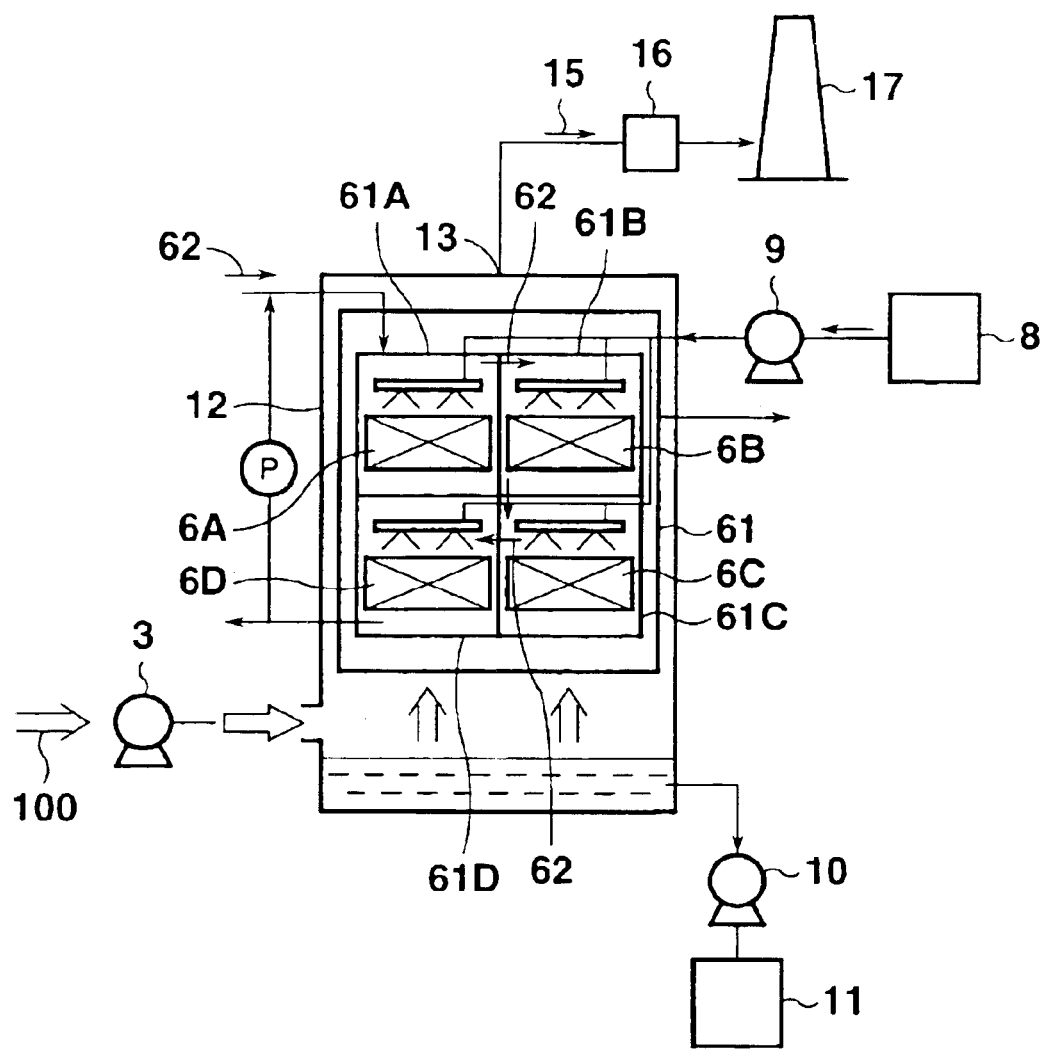
FIG. 20 is a structural diagram of a flue gas desulfurization apparatus according to a sixth embodiment.

FIG. 20 is a system configuration of a flue gas desulfurization apparatus according to a sixth embodiment.

As shown in FIG. 20, the flue gas desulfurization apparatus according to the embodiment effectively wets a plurality of catalyst units 6.

As shown in FIG. 20, the flue gas desulfurization apparatus according to the embodiment includes a plurality of catalyst wetting tanks 61 (four tanks in this embodiment). Catalyst wetting chambers 61A to 61D contain catalyst units 6A to 6D, respectively. Wetting water 62 is sequentially transferred from catalyst wetting chambers 61A to 61D.

Specifically, the catalyst unit 6 is placed in each of catalyst wetting chambers 61A to 61D, and wetting water 62 is supplied from the outside to the chambers. At first, the catalyst wetting chamber 61A is filled with water. After the catalyst units have been immersed in water for a predetermined period of time, wetting water 62 is transferred to the catalyst wetting chamber 61B, to thereby fill the chamber fully with water. The procedure is sequentially performed.

In this case, even when a plurality of catalyst units 6 are placed, the amount of wetting water is saved to the amount of one chamber, leading to reduction of the amount of water used. In addition, a load on the desulfurization tower 4 during water supply can be mitigated.

Next, an embodiment of the invention in which water-retaining ability is imparted to a plate-like activated carbon fiber sheet forming the activated carbon fiber board serving as a member of the catalyst unit 6 will be described.

According to the aforementioned embodiments, water is supplied from the outside to the catalyst unit 6, and the catalyst unit is wetted by water permeating the catalyst. However, according to the present embodiment, the activated carbon fiber board is imparted with self-wetting ability.

Figure 21:
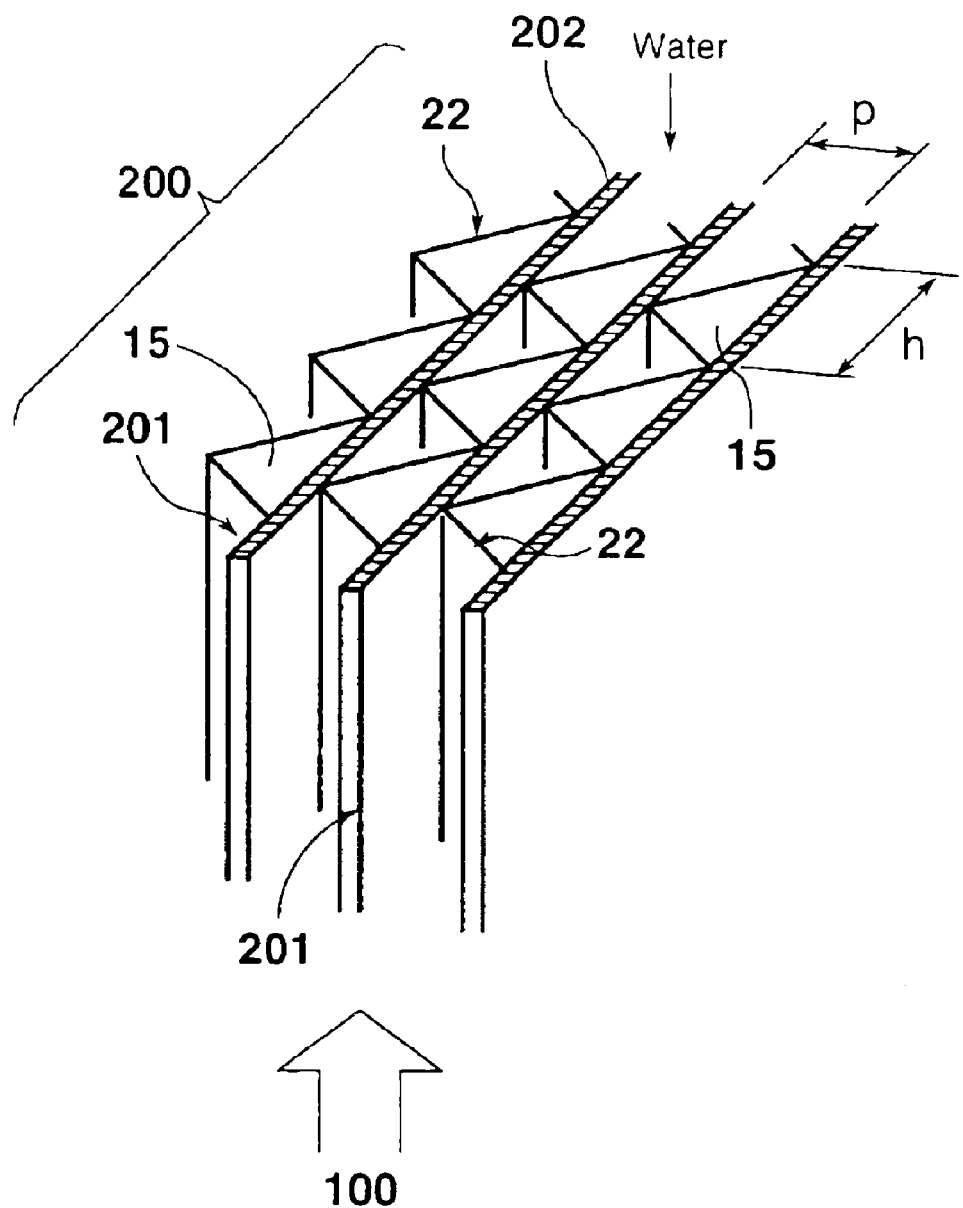
FIG. 21 is a perspective view of an activated carbon fiber board according to another embodiment.

As shown in FIG. 21, the activated carbon fiber board 200 according to the embodiment is formed of plate-like activated carbon fiber sheets 201 and corrugated activated carbon fiber sheets 22. In each plate-like activated carbon fiber sheet 201, a water-retaining layer 202 is monolithically formed. The water-retaining layer 202, which is made of fiber having high water absorbability, can effectively supply water which is fed to the catalyst unit to the corrugated activated carbon fiber sheets 22. In this case, wetting conditions are attained by water retained inside the activated carbon fiber board.

The activated carbon fiber board 200 can be adapted to any one of the aforementioned embodiments. Particularly when the board is used in combination with the catalyst wetting tanks 61 as shown in FIGS. 19 and 20, the wetting effect increases.

Figure 22:
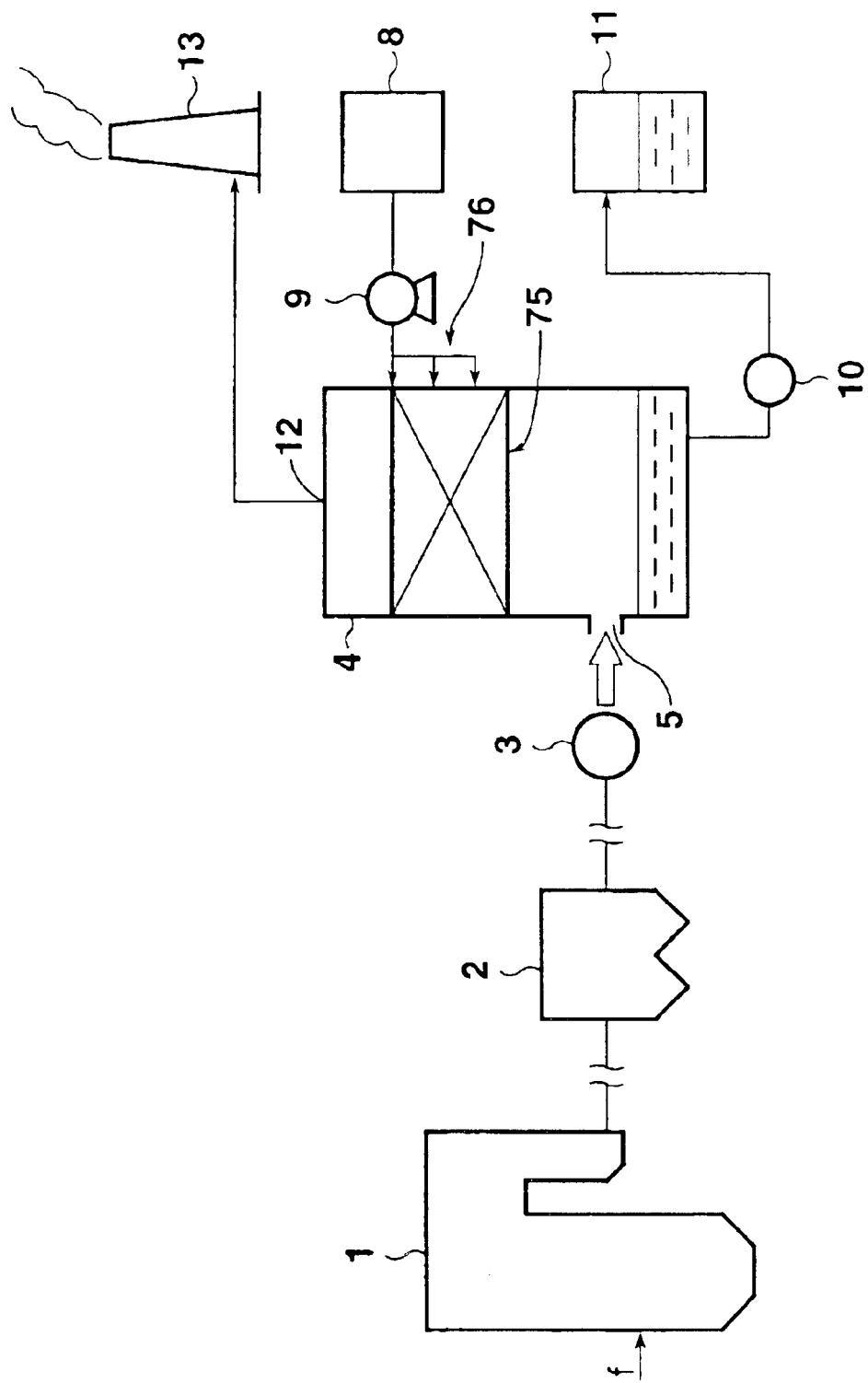
FIG. 22 is a system configuration of a discharge gas process system employing the flue gas desulfurization apparatus according to a seventh embodiment of the present invention.

With reference to FIG. 22, a discharge gas process system according to a seventh embodiment of the present invention will be described. In the discharge gas process system shown in FIG. 22, the catalyst unit 6 and the capillary member 7 contained in the discharge gas process system shown in FIG. 1 are replaced by catalyst means 75 and water-supply means 76. Herein, the same structural members as employed in the discharge gas process system shown in FIG. 1 are denoted by the same reference numerals.

As shown in FIG. 22, a boiler 1 for generating steam for driving a steam turbine (not illustrated) of a thermal power plant, combusts fuel f (e.g., coal or heavy oil) in its furnace. A discharge gas generated from the boiler 1 contains sulfur oxides ($SO_x$). The discharge gas undergoes a $NO_x$ removal process by means of an $NO_x$ removal unit (not illustrated), is cooled by means of a gas heater, and subsequently undergoes a soot removal process by means of a soot collector 2.

The thus-soot-removed discharge gas is fed, by means of a feed pump 3, from the inlet 5 provided in a lower section of the desulfurization tower 4 to the desulfurization tower. The desulfurization tower 4 includes the catalyst means 75 in which a plurality of catalyst stages formed of an activated carbon fiber board, and water for producing sulfuric acid is supplied from water-supply means 76 to the catalyst means 75. When the discharge gas is fed from the bottom of the catalyst means 75 and caused to pass through the catalyst means 75 to which water is supplied from the above nozzle, $SO_x$ contained in the discharge gas can be removed through chemical reaction. The discharge gas which has passed through the catalyst means 75 is discharged from an outlet 12, and is released to air through a chimney 13.

The catalyst means 75 contains a catalyst comprising an activated carbon fiber board. On a surface of the activated carbon fiber board, desulfurization reaction occurs (see reaction mechanism shown in the description in relation to FIG. 1).

The thus-released sulfuric acid ($H_2SO_4$) is dilute sulfuric acid and discharged into a sulfuric acid tank 11 via a discharge pump 10. As described above, desulfurization of the discharge gas is performed by causing sulfur dioxide ($SO_2$) contained in the discharge gas to be adsorbed by the activated carbon fiber boards contained in the catalyst means 75 for oxidation, reacting the oxidation product with water ($H_2O$), to thereby form sulfuric acid ($H_2SO_4$), and releasing the sulfuric acid from the catalyst unit.

The discharge gas process system as shown in FIG. 22 may include a mist-eliminator 19 shown as in FIG. 1.

Figure 23:
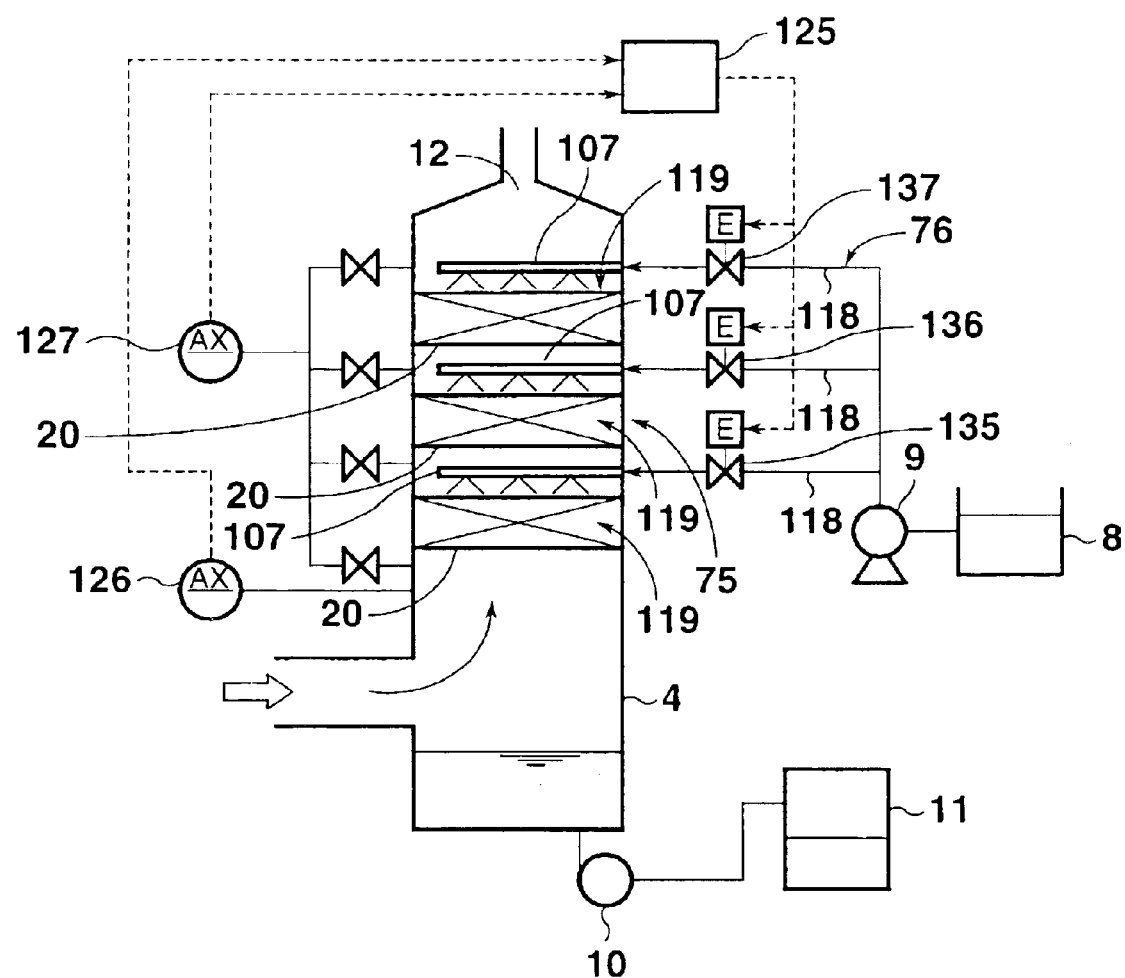
FIG. 23 is a schematic diagram of a desulfurization tower.

The structure of the catalyst means 75 provided in the desulfurization tower 4 will now be described with reference to FIG. 23.

Figure 5:
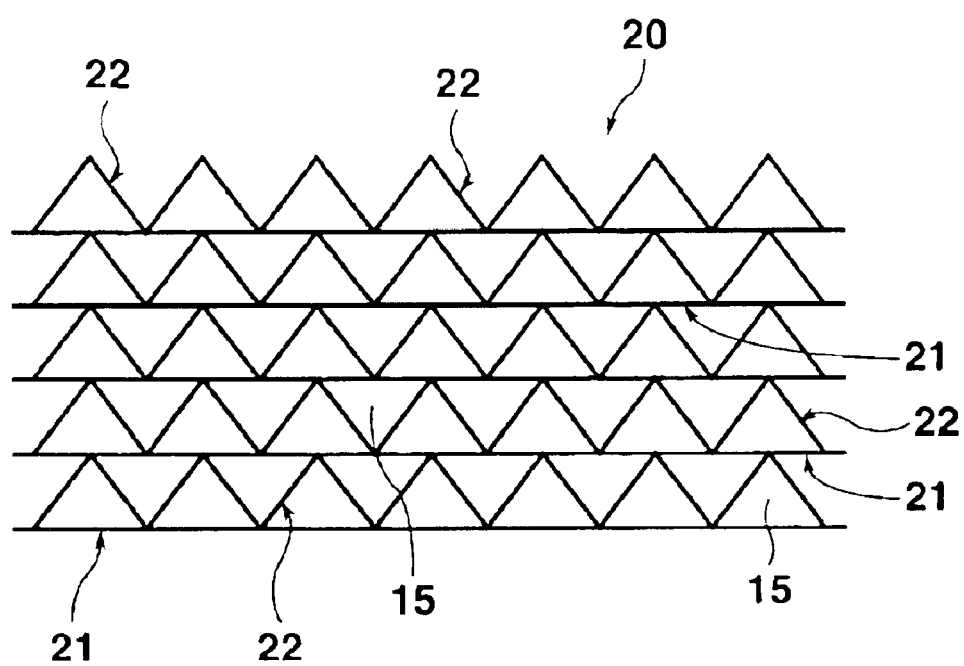
FIG. 5 is a cross-sectional view showing an activated carbon fiber board.

The catalyst means 75 provided in the desulfurization tower 4 includes three catalyst stages 119 (height of each stage: 2 m to 4 m), each incorporating the activated carbon fiber board 20 (see FIGS. 3 through 5). The number of the stages of the catalyst stages 119 provided in the catalyst means 75 is not limited to three, and may be two, or four or more. Water-supplying nozzles 107 (water supply means 76) are provided above the respective catalyst stages 119. Water for forming sulfuric acid is supplied from each of the water-supplying nozzles 107 onto the corresponding catalyst stage 119. Water is supplied from a water tank 8 via a pump 9 and feed lines 118 to the water-supplying nozzles 107.

A first valve 135 is provided on the feed line 118 of the water-supplying nozzle 107 from which water is supplied to the bottom (upstream) catalyst stage 119; a second valve 136 is provided on the feed line 118 of the water-supplying nozzle 107 from which water is supplied to the middle catalyst stage 119; and a third valve 137 is provided on the feed line 118 of the water-supplying nozzle 107 from which water is supplied to the top catalyst stage 119.

Opening/closure operation of the first valve 135, the second valve 136, and the third valve 137 is controlled by the control means 125, to thereby regulate the amount of water supplied to each of the catalyst stages 119. The first valve 135, the second valve 136, and the third valve 137 may be operated manually.

$O_2$ analysis means (oxygen concentration detection means) 126 for detecting the concentration of oxygen ($O_2$) in the desulfurization tower 4 is provided in the vicinity of the inlet 5 of the desulfurization tower 4. Detection data from the $O_2$ analysis means 126 are input to the control means 125. The concentration of $O_2$ in the desulfurization tower is on the order of some percent. Therefore, the $O_2$ analysis means 126 may be provided in the vicinity of the outlet 12 or any other portion of the desulfurization tower. Even when the $O_2$ analysis means 126 is provided at an arbitrary position of the desulfurization tower, data obtained by the analysis means can be employed as $O_2$ concentration data at the catalyst means 75. The concentration of $O_2$ in the desulfurization tower 4 may be calculated on the basis of the combustion conditions (e.g., fuel/air ratio) in the boiler 1.

The desulfurization tower 4 includes $SO_2$ analysis means (sulfur oxide concentration detection means) 127 for detecting sulfur oxide ($SO_2$) concentration on a gas-outlet side of each of the catalyst stages 119 and on a gas-inlet side of the upstream catalyst stage 119. By means of the $SO_2$ analysis means 127, the $SO_2$ concentration on the gas-outlet side of the bottom catalyst stage 119 is detected as a first concentration; the $SO_2$ concentration on the gas-outlet side of the middle catalyst stage 119 is detected as a second concentration; and the $SO_2$ concentration on the gas-outlet side of the top catalyst stage 119 is detected as a third concentration. Detection data from the $SO_2$ analysis means 127 are input to the control means 125. The $SO_2$ analysis means 127 may be provided at any position of the desulfurization tower at which $SO_2$ concentration is to be detected.

Figure 24:
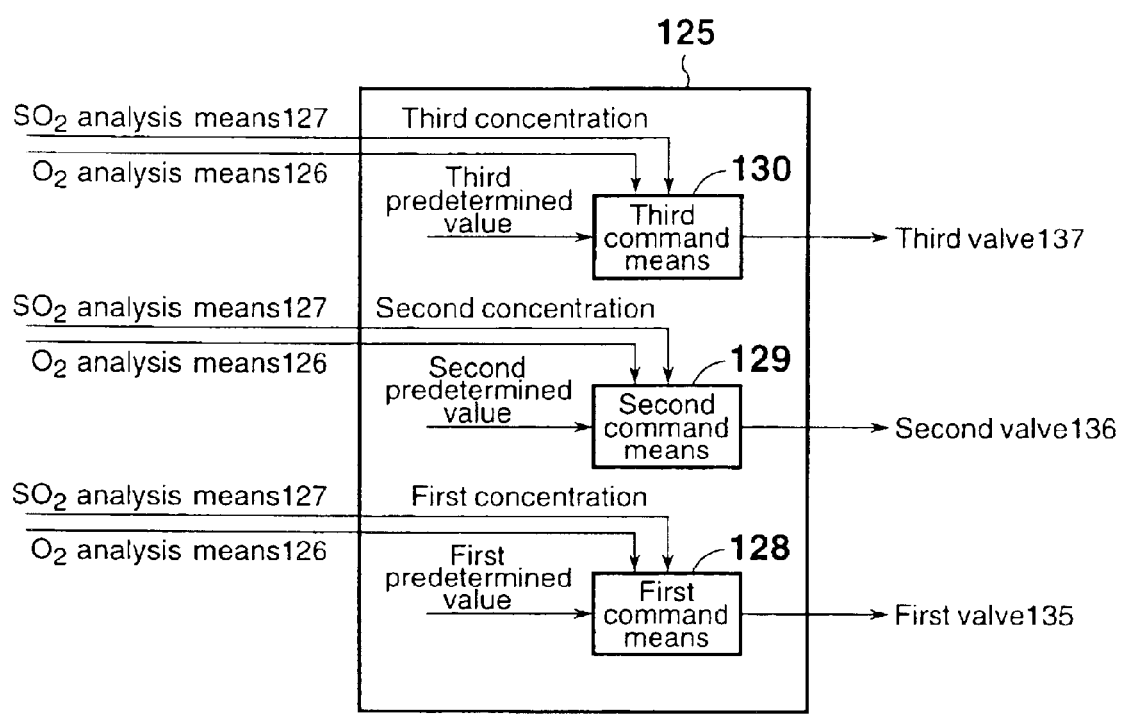
FIG. 24 is a block diagram showing control means.

The structure of the control means 125 will now be described with reference to a block diagram shown in FIG. 24.

The control means 125 includes first command means 128 for outputting an opening/closure command to the first valve 135, second command means 129 for outputting an opening/closure command to the second valve 136 and third command means 130 for outputting an opening/closure command to the third valve 137. Data of the first concentration from the $SO_2$ sensor 127 and data from the $O_2$ sensor 126 are input to the first command means 128; data of the second concentration from the $SO_2$ sensor 127 and data from the $O_2$ sensor 126 are input to the second command means 129; and data of the third concentration from the $SO_2$ analysis means 127 and data from the $O_2$ analysis means 126 are input to the third command means 130.

Predetermined values corresponding to the $SO_2$ concentrations on the gas-outlet sides of the catalyst stages 119 are stored in the aforementioned command means; specifically, a first predetermined value is stored in the first command means 128, a second predetermined value is stored in the second command means 129, and a third predetermined value is stored in the third command means 130. The first concentration is compared with the first predetermined value in the first command means 128; the second concentration is compared with the second predetermined value in the second command means 129; and the third concentration is compared with the third predetermined value in the third command means 130. On the basis of the results of the above comparisons and the $O_2$ concentration data from the $O_2$ analysis means 126, opening/closure operation of the first, second, and third valves 135, 136, and 137 is controlled, to thereby regulate the amount of water fed to the desulfurization tower such that the first, second, and third concentrations are regulated to the first, second, and third predetermined values, respectively.

Conditions for supplying water to the catalyst stages 119 will now be described.

Figure 26:
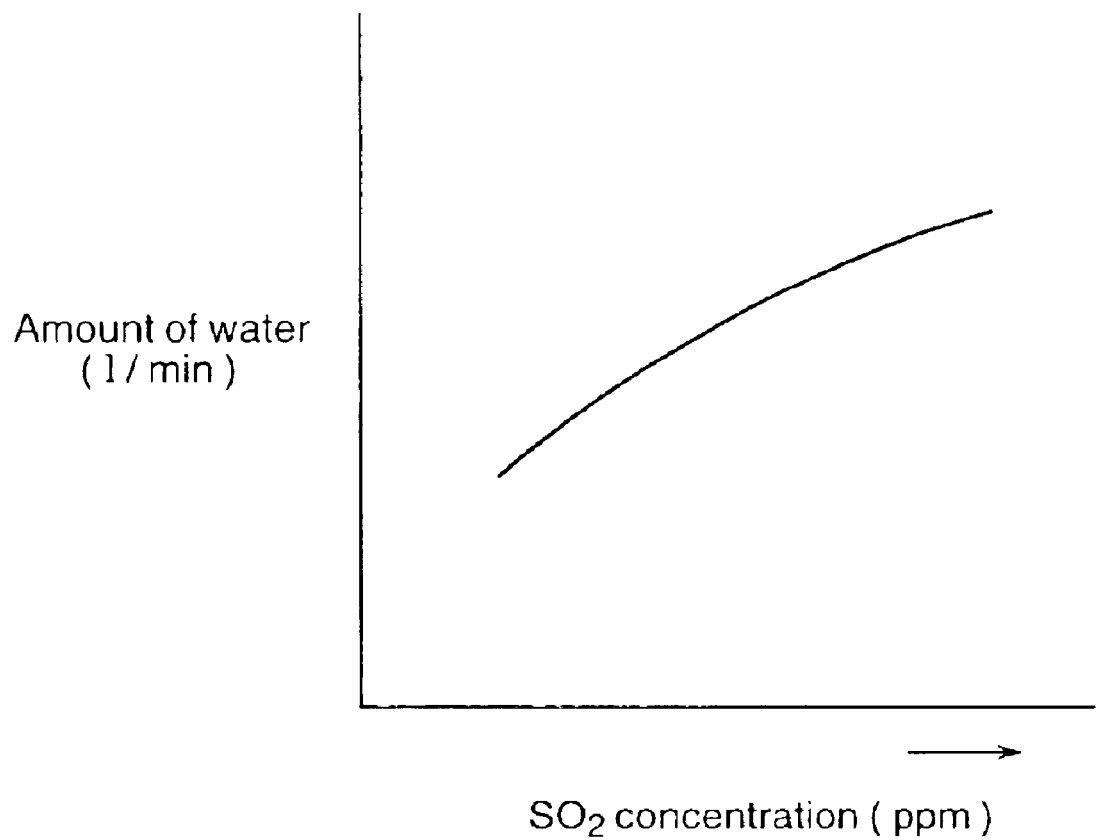
FIG. 26 is a graph showing the relationship between amount of water and sulfur dioxide concentration.
Figure 27:
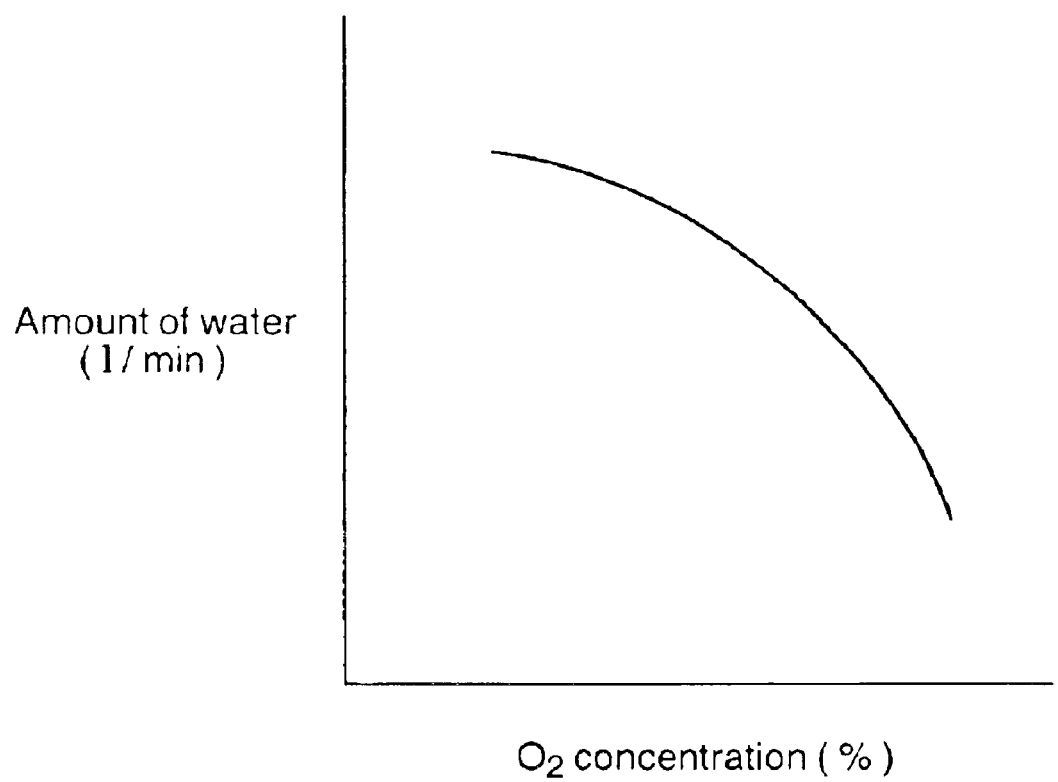
FIG. 27 is a graph showing the relationship between amount of water and oxygen concentration.

Data regarding the relation between $SO_2$ concentration (ppm) and water amount (1/min) under a certain fixed $O_2$ concentration are stored in a matrix form in the control means 125. As shown in FIG. 26, the amount of water supplied to the catalyst stages is increased in accordance with an increase in $SO_2$ concentration. Also, data regarding the relation between $O_2$ concentration (%) and water amount (1/min) under a certain fixed $SO_2$ concentration are stored in a matrix form in the control means 125. As shown in FIG. 27, the amount of water supplied to the catalyst stages is reduced in accordance with an increase in $O_2$ concentration. The control means 125 employs an $SO_2$ concentration function and an $O_2$ concentration function, to thereby calculate $SO_2$ and $O_2$ concentrations. On the basis of the thus-calculated results, the control means 125 outputs percent-opening regulation commands to the first, second, and third valves 135, 136, and 137.

Figure 25:
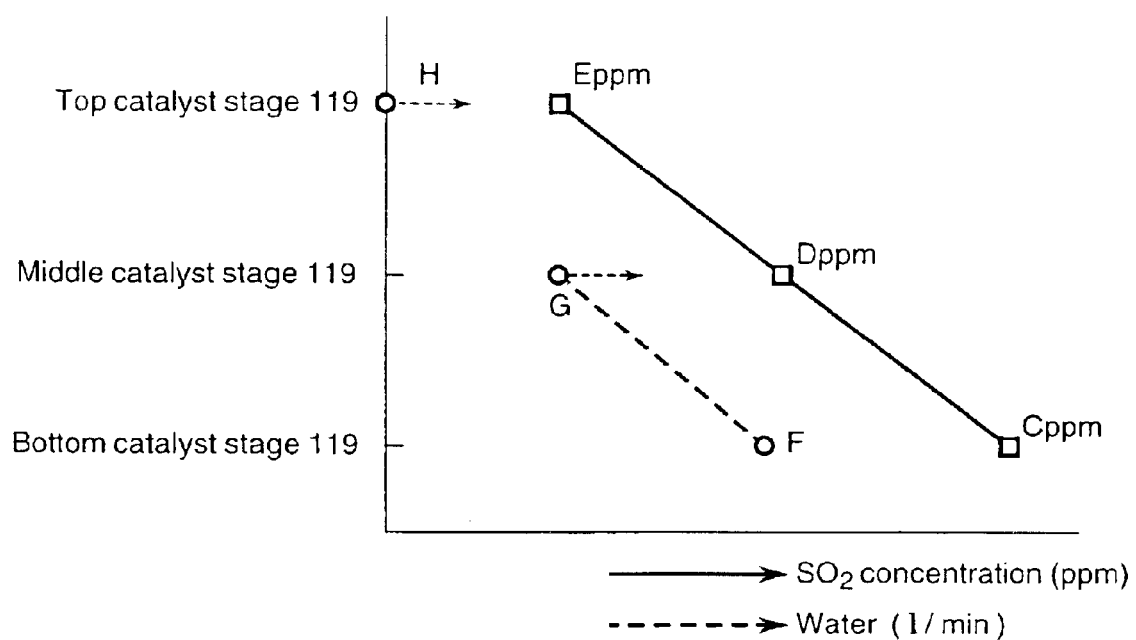
FIG. 25 is a graph showing the relationship between the stage of catalyst and sulfur oxide concentration or amount of water.

When the concentration of $SO_2$ contained in a discharge gas introduced through the inlet 5 is A ppm (e.g., 400 ppm), and the concentration of $O_2$ in the desulfurization tower 4 is B % (e.g., 2 to 3%), the first predetermined value, the second predetermined value, and the third predetermined value are determined as C ppm (e.g., 150 ppm), D ppm (e.g., 30 ppm), and E ppm (e.g., 4 ppm), respectively. Subsequently, as shown in FIG. 25, the amounts of water supplied to the catalyst stages 119 are regulated such that the $SO_2$ concentrations on the gas-outlet sides of the bottom catalyst stage 119, the middle catalyst stage 119, and the top catalyst stage 119 are regulated to C ppm, D ppm, and E ppm, respectively. Specifically, the amount of water supplied to the bottom catalyst stage 119 is regulated to F 1/min (e.g., 150 1/min); the amount of water supplied to the middle catalyst stage 119 is regulated to G 1/min (e.g., 50 1/min); and the amount of water supplied to the top catalyst stage 119 is regulated to H 1/min (e.g., 10 1/min).

Figure 29:
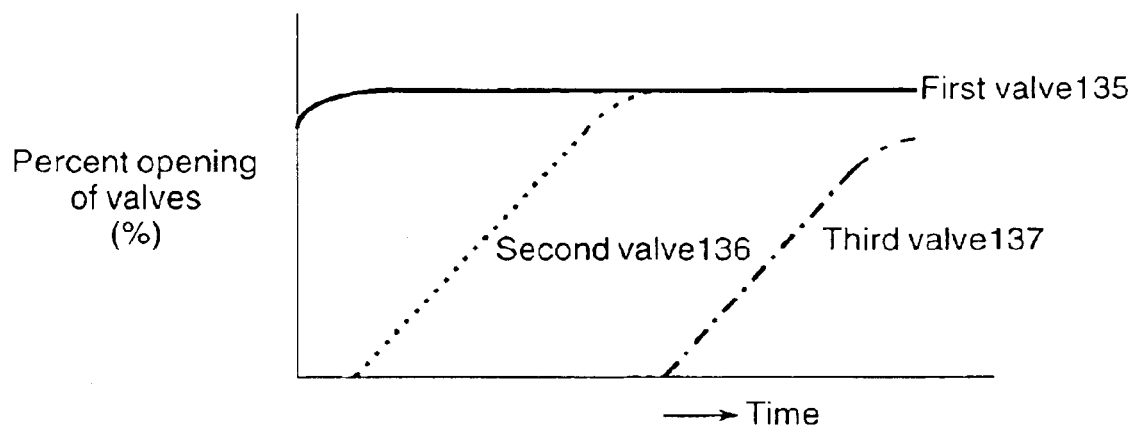
FIG. 29 is a graph showing a time-elapsed change in percent opening of valves for regulating water amount.

As shown in FIG. 28, the $SO_2$ concentration detected on the gas-outlet side of each of the catalyst stages 119 gradually increases with passage of time. The first command means 128 compares the $SO_2$ concentration detected at the bottom catalyst stage with the first predetermined value, to thereby output an opening/disclosure command to the first valve 135 such that the detected $SO_2$ concentration approaches the first predetermined value. The second command means 129 compares the $SO_2$ concentration detected at the middle catalyst stage with the second predetermined value, to thereby output an opening/disclosure command to the second valve 136 such that the detected $SO_2$ concentration approaches the second predetermined value. The third command means 130 compares the $SO_2$ concentration detected at the top catalyst stage with the third predetermined value, to thereby output an opening/disclosure command to the third valve 137 such that the detected $SO_2$ concentration approaches the third predetermined value. Therefore, as shown in FIG. 29, for each of the first, second, and third valves 135, 136, and 137, the percent of opening increases in accordance with an increase in $SO_2$ concentration, whereby the amount of water supplied to the respective catalyst stages 119 increases.

In the aforementioned flue gas processing apparatus including the catalyst means 75, three catalyst stages 119 are provided, and an appropriate amount of water is supplied from each water-supplying nozzle 107 to each catalyst stage 119 by a command of the control means 125. Thus, added water can be uniformly distributed, and constant $SO_2$ removal efficiency can be attained. In addition, since an optimum amount of water is supplied to each catalyst stage 119 in accordance with the $SO_2$ concentration, a required amount of water can be supplied to the target catalyst stage 119, thereby maintaining excellent $SO_2$ removal efficiency with a minimum required amount of water. Furthermore, since a required amount of water is provided, deterioration of each catalyst stage 119 due to dryness of sulfuric acid formed on the catalyst stage 119 can be prevented. When water is not supplied to the top catalyst stage 119, the catalyst stage 119 exerts a finishing effect on removal of $SO_2$ and can serve as a mist-catcher.

In the aforementioned embodiment, three catalyst stages 119 are provided, and water is supplied to each catalyst 119 from each water-supplying nozzle 107. By supplying water to the top catalyst stage 119 from at least the nozzle provided thereabove, droplets of water falling between the catalyst stages 119 are scattered. Thus, added water can be distributed almost uniformly. In this case, a member for dispersing water may be inserted as water-dispersion means between catalyst stages 119. However, pressure loss must be prevented.

Although, in the description in relation to the flue gas processing apparatuses of the aforementioned embodiments, dilute sulfuric acid is discharged to the sulfuric acid tank 11, dilute sulfuric acid may also be discharged to a gypsum deposition tank (see FIG. 2).

Figure 30:
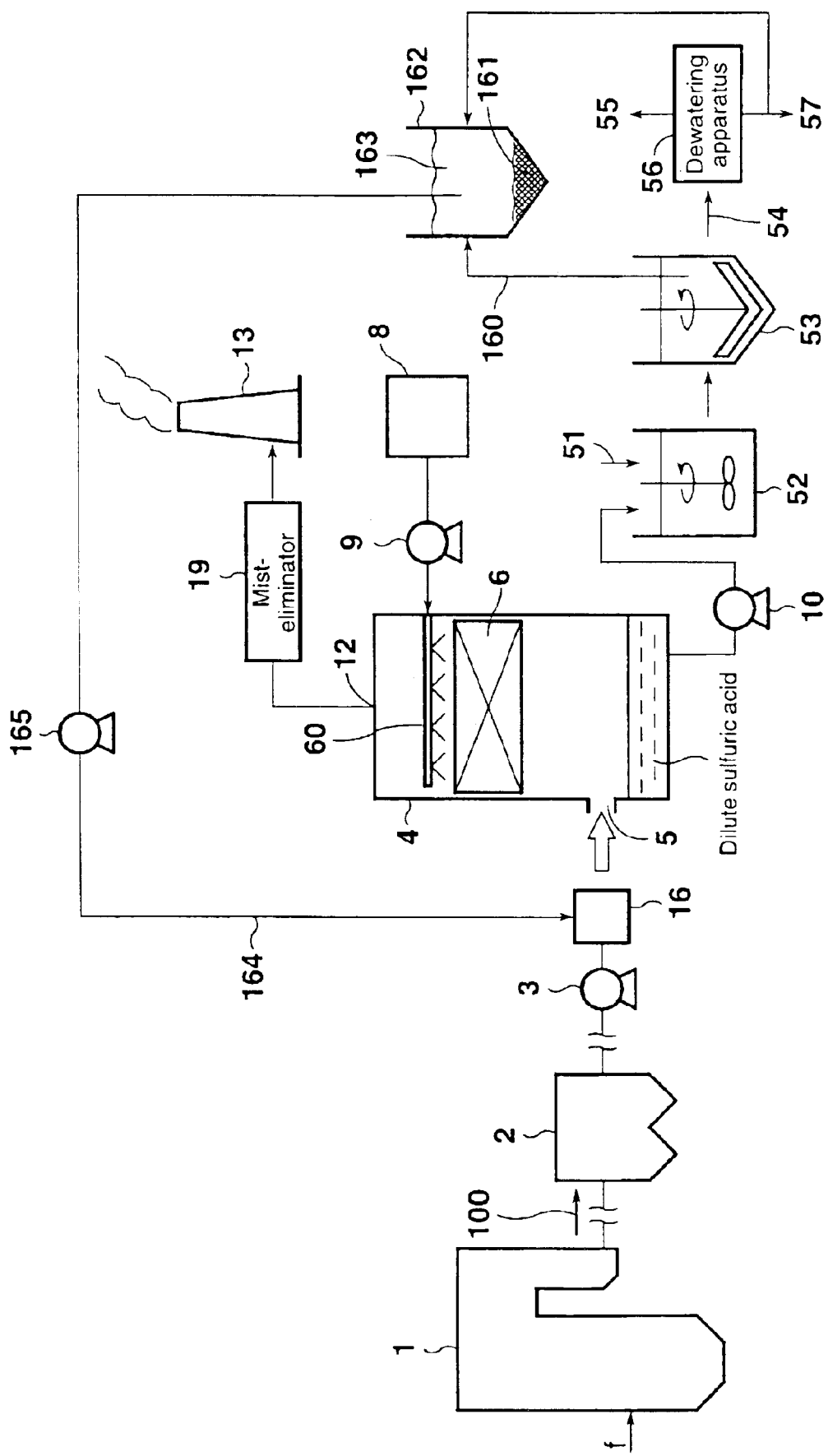
FIG. 30 is a schematic diagram of a discharge gas process system (production of gypsum) employing the flue gas desulfurization apparatus according to an eighth embodiment of the present invention.

With reference to FIG. 30, a discharge gas process system including a flue gas desulfurization apparatus according to an eighth embodiment of the present invention will be described. The discharge gas process system shown in FIG. 30 includes the discharge gas process system shown in FIG. 2 and a stationary tank to which a supernatant obtained in a settling tank 53 is fed. Herein, the same members as employed in the discharge gas process system shown in FIG. 2 are denoted by the same reference numerals.

Similar to the discharge gas process system shown in FIG. 2, in the discharge gas process system shown in FIG. 30, sulfur oxides contained in a discharge gas are removed by means of a desulfurization apparatus, to thereby form sulfuric acid, and lime slurry is fed to the resultant sulfuric acid, to thereby produce gypsum.

As shown in FIG. 30, the desulfurization apparatus according to the present embodiment includes a boiler 1 for generating steam for driving a steam turbine, a soot collector 2 for removing soot contained in a discharge gas 100 generated by the boiler 1, a feed fan 3 for feeding the soot-removed discharge gas into a desulfurization tower 4, a humidifying-cooling apparatus 16 for cooling and humidifying the discharge gas 100 in the desulfurization tower or before feeding to the desulfurization tower, the desulfurization tower 4, including a catalyst unit 6, for introducing the discharge gas 100 from an inlet 5 provided in a lower section of the sidewall of the tower and for feeding water through a water-supplying nozzle provided above the catalyst unit 6, to thereby effect desulfurization in which $SO_x$ contained in the discharge gas is converted to dilute sulfuric acid, a chimney 13 for discharging, to the outside, a purified (desulfurized) discharge gas released from an outlet 12 of the top of the tower, a gypsum reaction tank 52 for storing dilute sulfuric acid fed from the desulfurization tower 4 via a discharge pump 10 and for depositing gypsum by reaction with supplied lime slurry 51, a settling tank (thickener) 53 for settling gypsum, a dewatering apparatus 56 for removing water as waste water (filtrated liquid) 57 from gypsum slurry 54, to thereby yield gypsum 55, a stationary tank 162 for allowing a supernatant 160 obtained in the settling tank 53 to stand, to thereby yield a sediment 161 and a liquid-feed pump 165 for feeding a supernatant 163 obtained in the stationary tank 162 to the humidifying-cooling apparatus 16 as humidifying-cooling water 164.

The amount of gypsum slurry in the gypsum reaction tank 52 is controlled to 7 to 8 wt. %, and that in the settling tank 53 is controlled to approximately 20 wt. %.

An optional mist-eliminator 19 may be inserted in the line for discharging a purified (desulfurized) discharge gas generated from the desulfurization tower 4, to thereby separate water contained in the discharge gas.

The discharge gas process system employs the supernatant 160 obtained in the gypsum reaction tank 52 by adding lime slurry 51 to dilute sulfuric acid produced from the desulfurization tower 4 serving as the desulfurization apparatus. Thus, special water such as industrial water is not required to be used as water for humidifying-cooling, thereby attaining an effective system which reduces the amount of waste water.

In addition, gypsum slurry and salt components (e.g., Ca, Na, and K) remaining in the supernatant 160 are removed as a sediment 161 through provision of the stationary tank 162. Thus, problematic deposition of gypsum and salt components on the catalyst can be prevented. As a result, deterioration of desulfurization efficiency due to pressure loss and deterioration of catalytic activity for promoting desulfurization are prevented, attaining effective desulfurization.

In the present embodiment, the sediment 161 is removed by the stationary tank 162. However, the present invention is not limited to this embodiment. For example, gypsum particles remaining in the supernatant 160 in the gypsum settling tank can be separated through separation means such as a cyclator or a filter. These separation means may be employed singly or in combination.

In addition, a cooling tank for cooling the supernatant 160 in the gypsum settling tank may be provided. Through provision of the cooling tank, dissolved salt components can be precipitated, thereby further reducing the impurity content of the supernatant.

Furthermore, a salting-out tank for salting out salt components contained in the supernatant 160 may be provided. In the salting-out tank, salt components contained in the supernatant are intentionally removed on the basis of a chemical technique, which is in turn different from the aforementioned physical processes for separating impurities. The salting-out tank may be used singly or in combination with the above-described physical separation means.

The discharged water 57 obtained from the dewatering apparatus 56 may be fed to the stationary tank 162, to thereby yield a supernatant 163 again, and the supernatant may be employed as water for use in the humidifying-cooling apparatus 16.

The aforementioned boiler 1 for generating steam for driving a steam turbine (not illustrated) of a thermal power plant, combusts fuel f (e.g., coal or heavy oil) in its furnace. A discharge gas generated from the boiler 1 contains sulfur oxides ($SO_x$). The discharge gas undergoes a $NO_x$ removal process by means of an $NO_x$ removal unit (not illustrated), is cooled by means of a gas heater, and subsequently undergoes a soot removal process by means of a soot collector 2.

The thus-soot-removed discharge gas 100 is fed, by means of a feed fan 3, from the inlet 5 provided in the side wall in a lower section of the desulfurization tower 4 to the desulfurization tower. The desulfurization tower 4 includes the catalyst unit 6 formed of an activated carbon fiber board, and water for producing sulfuric acid is supplied from a water-supplying nozzle 60 to the catalyst unit 6. When the discharge gas is fed from the bottom of the catalyst unit and caused to pass through the catalyst unit 6, to which water is supplied from the above nozzle, $SO_x$ contained in the discharge gas 100 can be removed through chemical reaction. The discharge gas which has passed through the catalyst unit 6 is discharged from an outlet 12, and is released to air through a chimney 13.

The catalyst unit 6 contains a catalyst comprising a plurality of activated carbon fiber boards. On a surface of each activated carbon fiber board, desulfurization reaction occurs (see reaction mechanism shown in the description in relation to FIG. 1).

The sulfuric acid ($H_2SO_4$) removed through the process is discharged as dilute sulfuric acid into the gypsum reaction tank 52 via a discharge pump 10. As described above, desulfurization of the discharge gas is performed by causing sulfur dioxide ($SO_2$) contained in the discharge gas 100 to be adsorbed by the activated carbon fiber boards contained in the catalyst unit 6 for oxidation, reacting the oxidation product with water ($H_2O$), to thereby form sulfuric acid ($H_2SO_4$), and releasing the sulfuric acid from the catalyst unit.

Figure 31:
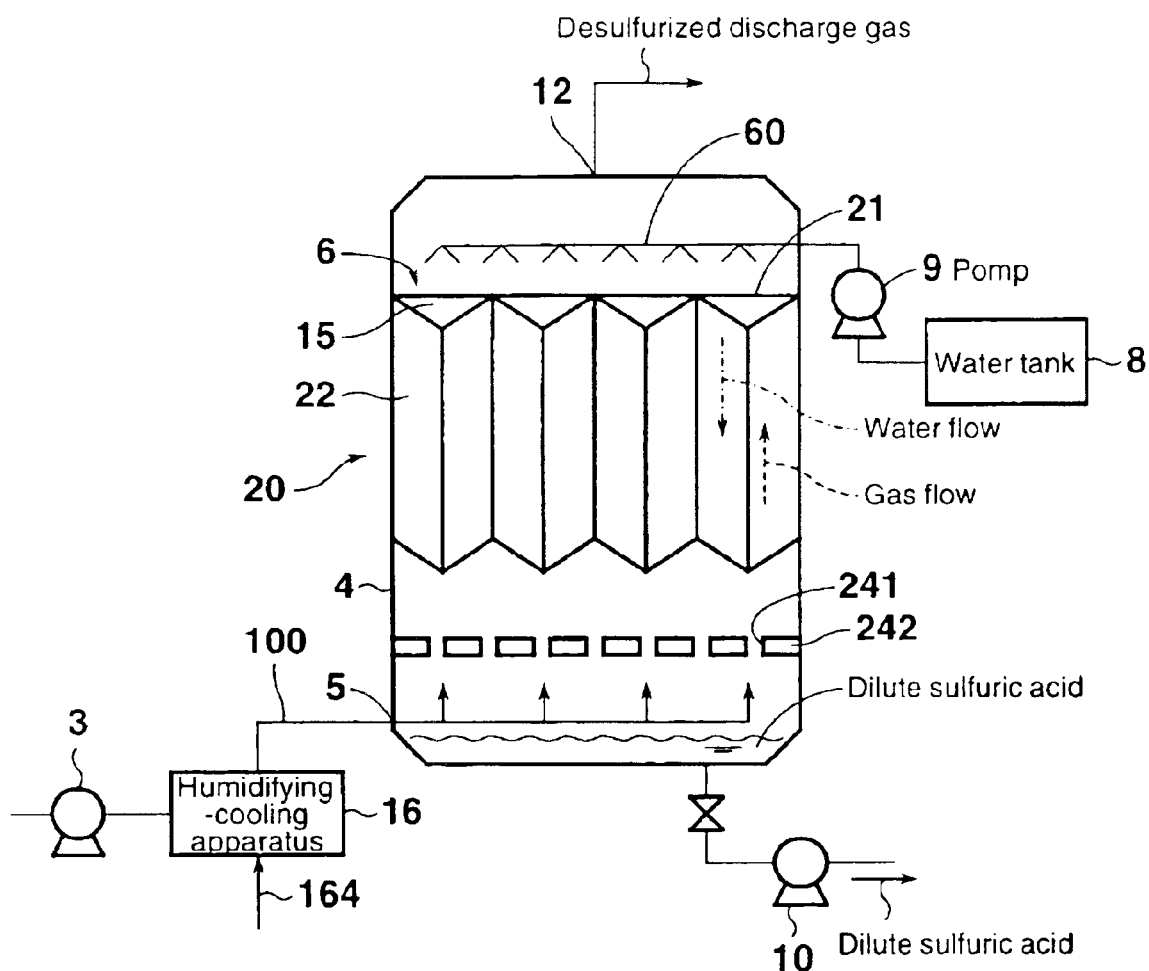
FIG. 31 is a schematic view showing the flue gas desulfurization apparatus.

With reference to FIG. 31, the structure of flue gas desulfurization apparatus will be described. FIG. 31 is a schematic view showing the flue gas desulfurization apparatus.

As shown in FIG. 31, the flue gas desulfurization apparatus includes an inlet 5 for introducing a discharge gas 100 containing sulfur oxides in the sidewall (or lower section) of the apparatus in the form of a tower, an outlet 12 for discharging the discharge gas 100, and a water-supplying nozzle 60 disposed above a catalyst unit 6 which is provided in the desulfurization tower 4 and which supplies water for producing sulfuric acid to the catalyst unit formed of an activated carbon fiber board 20. In a lower section of the tower, a distributor 242 having dispersion holes 241 for distributing the supplied discharge gas 100 is provided.

The activated carbon fiber board 20 which forms a unit catalyst in the catalyst unit 6 is formed by alternatingly juxtaposing on or more plate-like activated carbon fiber sheets 21 and one or more corrugated activated carbon fiber sheets 22. Spaces extending straightly and provided between two sheets serve as conduits 15, with the conduits 15 being extending vertically. The plate-like activated carbon fiber sheets 21 and the corrugated activated carbon fiber sheets 22 are formed into sheets. The corrugated activated carbon fiber sheet 22 is formed by use of a corrugator or similar means.

Alternatively, these activated carbon fiber sheets may be formed into a honeycomb shape so as to enable passage of the discharge gas in parallel to the sheets.

From the water-supplying nozzle 60, water is sprayed thereto, and the discharge gas 100 is introduced from a position below the activated carbon fiber boards. Water which has passed through the activated carbon fiber boards 20 falls, in the form of droplets of about some mm in size, to the bottom of the tower. The discharge gas 100 passes through comparatively narrow conduits 15 provided by alternatingly juxtaposing the plate-like carbon fiber sheets 21 and corrugated carbon fiber sheets 22. Thus, increase of pressure loss can be suppressed.

In order to place a catalyst unit in the desulfurization tower, a frame body (not illustrated) is filled with juxtaposed activated carbon fiber boards 20, to thereby provide a catalyst unit (e.g., height: 0.5 m to 4 m). The catalyst unit is placed in the desulfurization tower 4 by use of lifting means such as a crane.

The amount of water (water/humidified discharge gas) contained in the above discharge gas coming into contact with the catalyst units in the desulfurization tower 4 of the discharge gas desulfurization apparatus of the present invention is saturated vapor amount plus 0.5 to 10, preferably saturated vapor amount plus 1.0 to 1.5 vol. %. The saturated vapor amount is, for example, 12.2 vol. % (50° C.).

The saturated vapor amount is 7.3 vol. % at 40° C. or 19.7 vol. % at 60° C. When the amount of water is below the above saturated vapor amount, the aforementioned release of sulfuric acid during desulfurization cannot effectively be attained.

The cooling temperature during humidifying-cooling is appropriately determined on the basis of the relationship between temperature and water content of the discharge gas. For example, the cooling temperature is preferably 40 to 60° C. for the following reason. When the cooling temperature is higher than 60° C., the amount of vaporization increases, thereby increasing the amount of water to be supplied, resulting in an increase in cost. A cooling temperature lower than 40° C. cannot be attained when a discharge gas is cooled through a typical humidifying-cooling method.

When the discharge gas 100 having a saturated vapor amount which has been attained by humidifying-cooling by means of the humidifying-cooling apparatus 10 is fed into the desulfurization tower 4 and comes into contact with the catalyst contained in the catalyst units 6, release of $SO_3$ formed on the catalyst surface through oxidation of $SO_2$ smoothly proceeds by controlling the water content of the discharge gas to be the saturated vapor amount plus 0.5 to 10 (preferably, saturated vapor amount plus 1.0 to 1.5 vol. %). Thus, sulfuric acid does not remain on the surface of activated carbon fiber, and active sites are effectively utilized, thereby increasing desulfurization efficiency.

In the apparatus shown in FIG. 31, the discharge gas 100 is supplied from a lower section of the tower. In this case, mist (a form of water) possibly resides in a lower section of the tower. Thus, the amount of water supplied from the water-supplying nozzle 60 must be slightly increased such that the water content of discharge gas is saturated vapor amount plus 0.5 to 10 (preferably, saturated vapor amount plus 1.0 to 1.5 vol. %).

In contrast to the structure of FIG. 31, when the discharge gas 100 is supplied downward from an upper section of the tower, mist is also fed to the catalyst unit 6. Thus, the amount of supplied water might be decreased as compared with the structure of FIG. 31.

In either case, it is important for the discharge gas to have a water content equal to or higher than saturated vapor amount. Particularly, when the water content is controlled to saturated vapor amount plus 1.0 to 1.5 vol. %, whereby water can be supplied at remarkably high efficiency to the surface of activated carbon fiber serving as a catalyst. More specifically, only the saturated vapor amount is insufficient for forming sulfuric acid from $SO_3$—oxidation product of $SO_2$—and releasing sulfuric acid with water. When the water content is in excess of saturated vapor amount plus 1.5 vol. %, excessive water further dilutes dilute sulfuric acid and the amount of water required increases, which is disadvantageous. When the water content further increases, active sites of the surface of activated carbon fiber are covered with water, thereby failing to attain catalytic action. Thus, desulfurization efficiency decreases.

The correlation between saturated vapor and vapor mist has not been elucidated. When $SO_3$ formed through oxidation of $SO_2$ on the surface of activated carbon fiber is transformed into sulfuric acid by water and the sulfuric acid is discharged, an insufficient amount of water inhibits discharge of sulfuric acid, and subsequent oxidation of $SO_2$ becomes insufficient. When the amount of water is excessive, the yielded sulfuric acid is diluted. Furthermore, when the amount of water further increases, for example in the case in which the activated carbon fiber is covered with a thin layer or wall of water which covers active sites of the activated carbon fiber, such activated carbon fiber loses catalytic action of oxidizing $SO_2$, failing to attain desulfurization or deteriorating desulfurization efficiency.

Thus, according to the present invention, the amount of water (water/humidified discharge gas) contained in a discharge gas coming into contact with a catalyst unit is controlled to saturated vapor amount plus 1.0 to 1.5 vol. %, water falls intermittently as spherical droplets, and water can be supplied to the surface of activated carbon fiber in a sufficient, not excessive amount, and sulfuric acid can be released at high efficiency. As a result, desulfurization of a discharge gas can be effectively performed.

The particle size of droplets of cooling water supplied from the water-supplying nozzle 60 serving as the water-supply means is preferably controlled to 300 to 1,000 $\mu$m. This is because when the particle size is falling outside (excess) the above range, water cannot effectively be supplied to the surface of activated carbon fiber and release of sulfuric acid does not proceed sufficiently, which is not preferred. Particularly when a discharge gas is supplied from a lower section of the tower, water mist flies from the water-supplying nozzle, failing to attain favorable water supply. In contrast, when the particle size of droplets excessively increases, water forms a wall on the activated carbon fiber. In this case, active sites covered with water unfavorably stop desulfurization, although sulfuric acid can be released.

The amount of water fed from the aforementioned water-supply means is preferably 5 to 50 ml/m$^3$, wherein the passage rate of the discharge gas 100 fed into the tower is 0.5 to 5 m/s.

The particle size of mist formed in the discharge gas which has been humidified and cooled by the humidifying-cooling apparatus 16 is preferably controlled to 50 to 150 $\mu$m. This is because when the particle size is less than 50 $\mu$m, water contained in the discharge gas rapidly vaporize before feeding to the desulfurization tower, which is not preferred, whereas when the particle size is in excess of 150 $\mu$m, water is adhered inside the piping, which is not preferred.

In order to capture the aforementioned mist, a mist-catcher (not illustrated) may be provided. The mist-catcher suppresses incorporation of water to the desulfurization tower, thereby preventing dilution of sulfuric acid formed through desulfurization by means of the catalyst unit.

The discharge gas 100 which has been humidified and cooled in the aforementioned manner has a passage rate to the tower of 0.5 to 5 m/s, preferably 1 to 3 m/s. This is because when the passage rate is in excess of 5 m/s, the pressure loss increases, whereas when the passage rate is less than 0.5 m/s, the apparatus requires a wide area for desulfurization, both cases being disadvantageous.

As shown in FIG. 30, the apparatus according to the embodiment employs the supernatant 160 obtained in the settling tank 53 upon formation of gypsum slurry as humidifying-cooling water fed to the aforementioned humidifying-cooling apparatus 16, to thereby effectively utilize water.

In order to utilize the supernatant, the supernatant 160 obtained during settling gypsum slurry 54 in the settling tank 53 is subjected to settling again in the stationary tank 162. After separation of the settled gypsum slurry 54, the resultant supernatant 163 is utilized as water for humidifying-cooling 164.

In this case, residual matter remaining in the supernatant obtained by separating gypsum from gypsum slurry 54 is settled, and the resultant supernatant is utilized as water for humidifying-cooling that is fed, by means of the liquid-feed pump 165, to the humidifying-cooling apparatus 16. Thus, deposition of gypsum or a similar substance on activated carbon fiber constituting the catalyst unit 6 is prevented. As a result, desulfurization performance can be maintained for a long period of time without deteriorating desulfurization efficiency.

INDUSTRIAL APPLICABILITY

As described hereinabove, the present invention provides a flue gas desulfurization apparatus for removing sulfur oxides ($SO_x$) by evenly adding a minimum required amount of water to an activated carbon fiber board, the method being capable of reducing the amount of water required for removing sulfur oxides ($SO_x$).

The present invention also provides a flue gas desulfurization apparatus which discharges no industrial waste and which attains high efficiency, and a flue gas desulfurization apparatus which requires no absorbent for sulfur oxides, can be operated without a large desulfurization facility, and can produce high-concentration sulfuric acid during desulfurization, i.e., a flue gas desulfurization apparatus which can reduce the amount of supplied water and which allows uniform water distribution in the catalyst.

The present invention also provides a flue gas desulfurization apparatus which can perform a desulfurization reaction at high efficiency by use of activated carbon fiber; which provides a simple desulfurization system; and which attains high efficiency and small size, and a flue gas desulfurization apparatus which assures high overall efficiency of a desulfurization system and which maintains desulfurization performance over a long period of time.

What is claimed is:

1. A method for operating a flue gas desulfurization apparatus, including starting, stopping and restarting the flue gas desulfurization apparatus, the apparatus including;
 a catalyst unit formed of at least one activated carbon fiber board, and
 water supply means for supplying, to the catalyst unit, water for forming sulfuric acid,
 wherein the catalyst unit is provided in a tower through which a discharge gas containing sulfur oxide passes, and
 said water supply means is provided in the tower, and said method comprising:
 performing humidifying-cooling and cooling through addition of water until the discharge gas is cooled to approximately 70° C.;
 collecting low-concentration dilute sulfuric acid; and
 restarting the apparatus and at that time performing humidifying-cooling through addition of the low-concentration dilute sulfuric acid.

2. The method of claim 1, further comprising collecting dilute sulfuric acid having a concentration equal to or higher than a predetermined concentration so as to obtain a sulfuric acid product.

3. The method of claim 1, further comprising collecting dilute sulfuric acid having a concentration equal to or higher than a predetermined concentration and reacting the resultant dilute sulfuric acid with lime slurry so as to obtain gypsum.

4. A method for starting a flue gas desulfurization apparatus, the apparatus including:
 a catalyst unit formed of at least one activated carbon fiber board, and
 water supply means for supplying, to the catalyst unit, water for forming sulfuric acid,
 wherein the catalyst unit is provided in a tower through which a discharge gas containing sulfur oxide passes, and
 said water supply means is provided in the tower;
 wherein said method comprises:
 freezing the catalyst unit;
 placing the frozen catalyst unit in the tower; and
 starting the apparatus.

* * * * *